(12) United States Patent
Sylvain

(10) Patent No.: US 9,118,574 B1
(45) Date of Patent: Aug. 25, 2015

(54) PRESENCE REPORTING USING WIRELESS MESSAGING

(75) Inventor: Dany Sylvain, Gatineau (CA)

(73) Assignee: RPX Clearinghouse, LLC, San Francisco, CA (US)

( * ) Notice: Subject to any disclaimer, the term of this patent is extended or adjusted under 35 U.S.C. 154(b) by 2033 days.

(21) Appl. No.: 10/723,808

(22) Filed: Nov. 26, 2003

(51) Int. Cl.
*H04W 40/00* (2009.01)
*H04L 12/721* (2013.01)
*H04L 12/707* (2013.01)
*H04L 29/06* (2006.01)
*H04L 29/08* (2006.01)

(52) U.S. Cl.
CPC ........... *H04L 45/14* (2013.01); *H04L 45/22* (2013.01); *H04L 65/1006* (2013.01); *H04L 65/1026* (2013.01); *H04L 67/16* (2013.01)

(58) Field of Classification Search
CPC ..... H04L 45/22; H04L 45/14; H04L 65/1006; H04L 65/1026; H04L 65/103; H04L 65/1036; H04L 65/104; H04L 65/1096; H04L 67/16; H04L 12/66; H04L 43/0805; H04L 43/08; H04M 3/42; H04M 3/42374
USPC ........... 455/445, 426.1, 552.1, 422.1, 560, 455/432.1, 450, 550.1, 456.1, 414.1, 414.2, 455/428; 709/228, 239, 242
See application file for complete search history.

(56) References Cited

U.S. PATENT DOCUMENTS

| | | | |
|---|---|---|---|
| 4,932,050 A | 6/1990 | Davidson et al. | 379/211 |
| 5,185,782 A | 2/1993 | Srinivasan | 379/67 |
| 5,243,645 A | 9/1993 | Bissell et al. | 379/211 |
| 5,315,636 A | 5/1994 | Patel | 379/58 |
| 5,327,521 A | 7/1994 | Savic et al. | |
| 5,347,306 A | 9/1994 | Nitta | |
| 5,353,335 A | 10/1994 | D'Urso et al. | |
| 5,414,759 A | 5/1995 | Ishikuri et al. | 379/88 |

(Continued)

FOREIGN PATENT DOCUMENTS

| | | | | |
|---|---|---|---|---|
| EP | 1148688 A1 | 4/2000 | | H04L 29/06 |
| EP | 1071295 A2 | 1/2001 | | H04Q 7/22 |

(Continued)

OTHER PUBLICATIONS

Brodsky, Alexander et al., "Resource Management in Agent-based Distributed Environments," Proceedings of the 1999 International Symposium on Kyoto, Japan Nov. 28-30, 1999, pp. 95-108, XP010379697.

(Continued)

*Primary Examiner* — Khai M Nguyen
(74) *Attorney, Agent, or Firm* — Withrow & Terranova, PLLC

(57) ABSTRACT

The present invention provides for the delivery of presence information to a service node from a mobile terminal using a messaging service, such as the short messaging service. The mobile terminal is configured to communicate via a cellular network as well as via a terminal adaptor, which is coupled to a wireline telephony switch or a data access network to support telephony communications. A local wireless interface is provided between the mobile terminal and the terminal adaptor to support communications through the terminal adaptor. In operation, the mobile terminal will provide a messaging service message including presence information to the service node, wherein the presence information will bear on the ability of the mobile terminal to communicate with the terminal adaptor, and thus, facilitate communications through the terminal adaptor.

39 Claims, 10 Drawing Sheets

(56) References Cited

U.S. PATENT DOCUMENTS

| | | | |
|---|---|---|---|
| 5,450,613 A | 9/1995 | Takahara et al. ............. 455/54.1 |
| 5,541,981 A | 7/1996 | Lynn |
| 5,550,907 A | 8/1996 | Carlsen ........................ 379/207 |
| 5,555,376 A | 9/1996 | Theimer et al. .......... 395/200.09 |
| 5,586,171 A | 12/1996 | McAllister et al. |
| 5,596,633 A | 1/1997 | Meier et al. .................... 379/201 |
| 5,633,921 A | 5/1997 | Soderberg .................... 379/207 |
| 5,633,924 A | 5/1997 | Kaish et al. ................... 379/266 |
| 5,652,789 A | 7/1997 | Miner et al. |
| 5,742,905 A | 4/1998 | Pepe et al. .................... 455/461 |
| 5,749,073 A | 5/1998 | Slaney |
| 5,757,901 A | 5/1998 | Hiroshige .................... 379/212 |
| 5,771,280 A | 6/1998 | Johnson .................... 379/93.23 |
| 5,790,649 A | 8/1998 | Hiroshige .................... 379/201 |
| 5,812,126 A | 9/1998 | Richardson et al. |
| 5,812,865 A | 9/1998 | Theimer et al. ............... 395/800 |
| 5,812,972 A | 9/1998 | Juang et al. |
| 5,815,554 A | 9/1998 | Burgess et al. .............. 379/90.01 |
| 5,818,836 A | 10/1998 | DuVal |
| 5,825,864 A | 10/1998 | McGraw et al. .............. 379/210 |
| 5,835,568 A | 11/1998 | Bass et al. |
| 5,848,134 A | 12/1998 | Sekiguchi et al. |
| 5,860,064 A | 1/1999 | Henton |
| 5,864,848 A | 1/1999 | Horvitz et al. |
| 5,870,709 A | 2/1999 | Bernstein |
| 5,875,427 A | 2/1999 | Yamazaki |
| 5,880,731 A | 3/1999 | Liles et al. |
| 5,884,029 A | 3/1999 | Brush, II et al. |
| 5,884,262 A | 3/1999 | Wise et al. |
| 5,890,115 A | 3/1999 | Cole |
| 5,901,359 A * | 5/1999 | Malmstrom ................. 455/461 |
| 5,911,120 A * | 6/1999 | Jarett et al. .................... 455/417 |
| 5,911,129 A | 6/1999 | Towell |
| 5,930,702 A | 7/1999 | Goldman et al. ............ 455/417 |
| 5,933,805 A | 8/1999 | Boss et al. |
| 5,940,756 A | 8/1999 | Sibecas et al. |
| 5,960,004 A | 9/1999 | Ramström et al. |
| 5,960,173 A | 9/1999 | Tang et al. |
| 6,038,443 A | 3/2000 | Luneau |
| 6,052,597 A * | 4/2000 | Ekstrom ..................... 455/456.3 |
| 6,058,415 A | 5/2000 | Polcyn ......................... 709/200 |
| 6,067,357 A | 5/2000 | Kishinsky et al. ........... 379/265 |
| 6,085,232 A | 7/2000 | Kikinis |
| 6,104,799 A | 8/2000 | Jain et al. |
| 6,104,913 A | 8/2000 | McAllister .................... 455/41 |
| 6,111,937 A | 8/2000 | Kuroiwa et al. |
| 6,125,176 A | 9/2000 | Foladare et al. .............. 379/211 |
| 6,134,314 A | 10/2000 | Dougherty et al. ........... 379/207 |
| 6,141,356 A | 10/2000 | Gorman ........................ 370/493 |
| 6,144,644 A | 11/2000 | Bajzath et al. ................ 370/259 |
| 6,148,328 A | 11/2000 | Cuomo et al. |
| 6,173,250 B1 | 1/2001 | Jong |
| 6,173,262 B1 | 1/2001 | Hirschberg |
| 6,175,616 B1 | 1/2001 | Light et al. .................. 379/88.14 |
| 6,185,292 B1 | 2/2001 | Miloslavsky ................. 379/265 |
| 6,215,858 B1 | 4/2001 | Bartholomew et al. |
| 6,223,165 B1 | 4/2001 | Lauffer ............................ 705/8 |
| 6,226,361 B1 | 5/2001 | Koyama |
| 6,233,465 B1 * | 5/2001 | Smith et al. ................... 455/560 |
| 6,243,398 B1 | 6/2001 | Kahane et al. ................ 370/522 |
| 6,253,230 B1 | 6/2001 | Couland et al. |
| 6,260,148 B1 | 7/2001 | Aggarwal et al. ............ 713/201 |
| 6,282,511 B1 | 8/2001 | Mayer |
| 6,295,348 B1 | 9/2001 | Bleile et al. ................... 379/199 |
| 6,301,609 B1 | 10/2001 | Aravamudan et al. ........ 709/207 |
| 6,314,094 B1 | 11/2001 | Boys |
| 6,317,486 B1 | 11/2001 | Hollins et al. |
| 6,330,322 B1 | 12/2001 | Foladare et al. |
| 6,356,937 B1 | 3/2002 | Montville et al. |
| 6,366,651 B1 | 4/2002 | Griffith et al. |
| 6,366,886 B1 | 4/2002 | Dragosh et al. |
| 6,377,944 B1 | 4/2002 | Busey et al. ...................... 707/3 |
| 6,385,461 B1 | 5/2002 | Raith |
| 6,389,114 B1 | 5/2002 | Dowens et al. |
| 6,389,127 B1 | 5/2002 | Vardi et al. ................. 379/209.01 |
| 6,418,198 B2 | 7/2002 | Brablec et al. ................... 379/79 |
| 6,424,935 B1 | 7/2002 | Taylor |
| 6,430,289 B1 | 8/2002 | Liffick ......................... 379/900 |
| 6,430,395 B2 * | 8/2002 | Arazi et al. ................... 455/41.2 |
| 6,430,604 B1 | 8/2002 | Ogle et al. |
| 6,434,599 B1 | 8/2002 | Porter |
| 6,445,912 B1 | 9/2002 | Cole et al. ..................... 455/406 |
| 6,446,076 B1 | 9/2002 | Burkey et al. |
| 6,449,344 B1 | 9/2002 | Goldfinger et al. ......... 379/88.17 |
| 6,449,365 B1 | 9/2002 | Hodges et al. |
| 6,453,294 B1 | 9/2002 | Dutta et al. |
| 6,463,142 B1 | 10/2002 | Kilp ........................ 379/201.06 |
| 6,463,471 B1 | 10/2002 | Dreke et al. .................. 709/224 |
| 6,480,593 B1 | 11/2002 | Munday et al. .......... 379/211.02 |
| 6,483,900 B1 | 11/2002 | Light et al. ................. 379/88.17 |
| 6,484,196 B1 | 11/2002 | Maurille |
| 6,507,643 B1 | 1/2003 | Groner |
| 6,519,639 B1 | 2/2003 | Glasser et al. |
| 6,546,096 B1 | 4/2003 | Meiden et al. ............ 379/209.01 |
| 6,549,937 B1 | 4/2003 | Auerbach et al. |
| 6,560,648 B1 | 5/2003 | Dunn et al. ................... 709/224 |
| 6,564,261 B1 | 5/2003 | Gudjonsson et al. ......... 709/227 |
| 6,584,494 B1 | 6/2003 | Manabe et al. |
| 6,617,969 B2 | 9/2003 | Tu et al. |
| 6,618,704 B2 | 9/2003 | Kanevsky et al. |
| 6,618,710 B1 | 9/2003 | Zondervan et al. |
| 6,633,636 B1 * | 10/2003 | McConnell et al. ...... 379/220.01 |
| 6,640,241 B1 | 10/2003 | Ozzie et al. |
| 6,654,790 B2 | 11/2003 | Ogle et al. |
| 6,658,095 B1 | 12/2003 | Yoakum et al. ............ 379/93.01 |
| 6,665,395 B1 | 12/2003 | Busey et al. .............. 379/265.09 |
| 6,678,719 B1 | 1/2004 | Stimmel |
| 6,697,840 B1 | 2/2004 | Godefroid et al. ............ 709/205 |
| 6,700,966 B2 | 3/2004 | Takagi et al. ............. 379/201.06 |
| 6,728,754 B1 | 4/2004 | Lipton |
| 6,735,701 B1 | 5/2004 | Jacobson ....................... 713/201 |
| 6,738,461 B2 | 5/2004 | Trandal et al. ............ 379/142.02 |
| 6,741,853 B1 | 5/2004 | Jiang et al. |
| 6,799,209 B1 | 9/2004 | Hayton |
| 6,807,423 B1 | 10/2004 | Armstrong et al. ........... 455/440 |
| 6,810,411 B1 | 10/2004 | Coughlin et al. ............. 709/203 |
| 6,912,389 B2 | 6/2005 | Bright et al. |
| 6,920,498 B1 | 7/2005 | Gourlay et al. |
| 6,940,844 B2 | 9/2005 | Purkayastha et al. |
| 6,985,720 B2 | 1/2006 | Qu et al. |
| 6,985,961 B1 | 1/2006 | Ramsayer et al. |
| 7,020,480 B2 | 3/2006 | Coskun et al. |
| 7,035,923 B1 | 4/2006 | Yoakum et al. |
| 7,043,248 B2 | 5/2006 | Hallenstal et al. |
| 7,058,415 B2 | 6/2006 | Bushnell et al. |
| 7,103,651 B2 | 9/2006 | Bohannon et al. |
| 7,136,631 B1 | 11/2006 | Jiang et al. |
| 7,212,617 B2 | 5/2007 | Owens et al. |
| 7,269,162 B1 | 9/2007 | Turner |
| 7,356,137 B1 | 4/2008 | Burg et al. |
| 7,522,632 B2 | 4/2009 | La Porta et al. |
| 8,122,363 B1 | 2/2012 | Appelman |
| 8,644,475 B1 | 2/2014 | Yoakum et al. |
| 2001/0005412 A1 | 6/2001 | Light et al. ................. 379/88.13 |
| 2001/0039585 A1 | 11/2001 | Primak et al. ................. 709/228 |
| 2001/0044299 A1 | 11/2001 | Sandegren .................... 455/422 |
| 2001/0053213 A1 | 12/2001 | Truong et al. ............. 379/202.01 |
| 2001/0053214 A1 | 12/2001 | Kleinoder et al. ......... 379/207.04 |
| 2002/0006803 A1 | 1/2002 | Mendiola et al. ............. 455/466 |
| 2002/0024947 A1 | 2/2002 | Luzzatti et al. ............... 370/352 |
| 2002/0032035 A1 | 3/2002 | Teshima |
| 2002/0035605 A1 | 3/2002 | McDowell et al. |
| 2002/0038360 A1 | 3/2002 | Andrews et al. .............. 709/223 |
| 2002/0049842 A1 | 4/2002 | Huetsch et al. |
| 2002/0055975 A1 | 5/2002 | Petrovykh ..................... 709/205 |
| 2002/0059622 A1 | 5/2002 | Grove et al. ..................... 725/91 |
| 2002/0060088 A1 | 5/2002 | Shtivelman .................... 370/259 |
| 2002/0065894 A1 | 5/2002 | Dalal et al. .................... 709/206 |
| 2002/0076010 A1 | 6/2002 | Sahai ........................... 379/88.19 |
| 2002/0078188 A1 | 6/2002 | Anand et al. .................. 709/222 |
| 2002/0085516 A1 * | 7/2002 | Bridgelall .................... 370/329 |
| 2002/0101993 A1 | 8/2002 | Eskin ............................ 380/270 |
| 2002/0102993 A1 | 8/2002 | Hendrey et al. |
| 2002/0111173 A1 | 8/2002 | Hendrey et al. |

(56) References Cited

U.S. PATENT DOCUMENTS

| | | |
|---|---|---|
| 2002/0114432 A1 | 8/2002 | Shaffer et al. ............... 709/204 |
| 2002/0116336 A1 | 8/2002 | Diacakis et al. |
| 2002/0116461 A1 | 8/2002 | Diacakis et al. ............. 709/204 |
| 2002/0120687 A1 | 8/2002 | Diacakis et al. ............. 709/204 |
| 2002/0126701 A1 | 9/2002 | Requena ..................... 370/469 |
| 2002/0131395 A1 | 9/2002 | Wang |
| 2002/0143876 A1 | 10/2002 | Boyer et al. ................. 709/205 |
| 2002/0143877 A1 | 10/2002 | Hackbarth et al. ........... 709/205 |
| 2002/0147008 A1* | 10/2002 | Kallio ......................... 455/426 |
| 2002/0147777 A1 | 10/2002 | Hackbarth et al. ........... 709/205 |
| 2002/0147814 A1 | 10/2002 | Kimchi et al. ............... 709/226 |
| 2002/0163572 A1 | 11/2002 | Center, Jr. et al. ........ 348/14.08 |
| 2002/0165000 A1 | 11/2002 | Fok |
| 2002/0181693 A1 | 12/2002 | Ribera ..................... 379/265.09 |
| 2002/0194335 A1 | 12/2002 | Maynard ..................... 709/225 |
| 2002/0196770 A1* | 12/2002 | Lin ............................ 370/349 |
| 2003/0004762 A1 | 1/2003 | Banerjee et al. ................. 705/5 |
| 2003/0018704 A1 | 1/2003 | Polychronidis et al. ...... 709/202 |
| 2003/0023623 A1 | 1/2003 | Horvitz et al. |
| 2003/0023681 A1 | 1/2003 | Brown et al. |
| 2003/0026289 A1 | 2/2003 | Mukherjee et al. ........... 370/466 |
| 2003/0028621 A1 | 2/2003 | Furlong et al. |
| 2003/0035529 A1 | 2/2003 | Baker ...................... 379/211.02 |
| 2003/0037103 A1 | 2/2003 | Salmi et al. |
| 2003/0037113 A1 | 2/2003 | Petrovykh ................... 709/205 |
| 2003/0041101 A1 | 2/2003 | Hansche et al. ............. 709/203 |
| 2003/0048195 A1 | 3/2003 | Trossen .................. 340/825.49 |
| 2003/0052915 A1 | 3/2003 | Brown et al. |
| 2003/0055897 A1 | 3/2003 | Brown et al. |
| 2003/0059029 A1 | 3/2003 | Mengshoel et al. ..... 379/265.02 |
| 2003/0065721 A1 | 4/2003 | Roskind ....................... 709/204 |
| 2003/0065788 A1 | 4/2003 | Salomaki ..................... 709/227 |
| 2003/0069934 A1 | 4/2003 | Garcia-Martin et al. |
| 2003/0073440 A1 | 4/2003 | Mukherjee et al. ........... 455/435 |
| 2003/0078979 A1 | 4/2003 | Sagi |
| 2003/0093482 A1 | 5/2003 | Watanabe et al. |
| 2003/0095510 A1 | 5/2003 | Dorenbsoch |
| 2003/0101278 A1 | 5/2003 | Garcia-Luna-Aceves et al. ............................ 709/240 |
| 2003/0104819 A1 | 6/2003 | Knauerhase et al. |
| 2003/0105820 A1 | 6/2003 | Haims et al. ................ 709/205 |
| 2003/0129972 A1 | 7/2003 | Tosaki et al. ................ 455/414 |
| 2003/0134638 A1* | 7/2003 | Sundar et al. ............... 455/435 |
| 2003/0135624 A1 | 7/2003 | McKinnon et al. .......... 709/228 |
| 2003/0154293 A1 | 8/2003 | Zmolek ....................... 709/228 |
| 2003/0174814 A1 | 9/2003 | Diacakis ......................... 379/80 |
| 2003/0181693 A1 | 9/2003 | Cook et al. |
| 2003/0206619 A1 | 11/2003 | Curbow et al. .......... 379/210.01 |
| 2003/0217099 A1 | 11/2003 | Bobde et al. |
| 2003/0217142 A1 | 11/2003 | Bobde et al. |
| 2003/0224795 A1 | 12/2003 | Wilhoite et al. |
| 2003/0225848 A1 | 12/2003 | Heikes et al. |
| 2003/0229722 A1 | 12/2003 | Beyda |
| 2003/0233537 A1 | 12/2003 | Wohlgemuth et al. |
| 2003/0235287 A1 | 12/2003 | Margolis .................. 379/265.01 |
| 2004/0037271 A1 | 2/2004 | Liscano et al. ............... 370/352 |
| 2004/0044647 A1 | 3/2004 | Salmenkaita ..................... 707/1 |
| 2004/0059781 A1 | 3/2004 | Yoakum et al. |
| 2004/0072593 A1* | 4/2004 | Robbins et al. ............... 455/560 |
| 2004/0073614 A1 | 4/2004 | Blohm |
| 2004/0122810 A1 | 6/2004 | Mayer ............................. 707/3 |
| 2004/0122901 A1 | 6/2004 | Sylvain |
| 2004/0125941 A1 | 7/2004 | Yoakum |
| 2004/0153506 A1 | 8/2004 | Ito et al. ....................... 709/204 |
| 2004/0172528 A1 | 9/2004 | Tenereillo |
| 2004/0174966 A1 | 9/2004 | Koch .......................... 379/88.22 |
| 2004/0177278 A1 | 9/2004 | Lipton |
| 2004/0202940 A1 | 10/2004 | Kramer et al. |
| 2004/0203606 A1 | 10/2004 | Souissi et al. |
| 2004/0203680 A1* | 10/2004 | Sylvain ......................... 455/417 |
| 2004/0203746 A1 | 10/2004 | Knauerhase et al. |
| 2004/0203927 A1 | 10/2004 | Kraft |
| 2004/0249776 A1 | 12/2004 | Horvitz et al. ................. 706/21 |
| 2004/0266398 A1* | 12/2004 | Adamczyk et al. ........ 455/412.1 |
| 2005/0041580 A1 | 2/2005 | Petrovykh |
| 2005/0044144 A1 | 2/2005 | Malik et al. |
| 2005/0074101 A1 | 4/2005 | Moore et al. ............. 379/114.01 |
| 2005/0086211 A1 | 4/2005 | Mayer |
| 2005/0117570 A1 | 6/2005 | Cetusic et al. ................ 370/352 |
| 2005/0148353 A1 | 7/2005 | Hicks, III et al. |
| 2005/0159153 A1* | 7/2005 | Mousseau et al. ......... 455/432.1 |
| 2005/0172011 A1 | 8/2005 | Gourlay et al. |
| 2006/0003766 A1 | 1/2006 | Parameswar et al. |
| 2006/0078101 A1 | 4/2006 | Light et al. |
| 2006/0116125 A1 | 6/2006 | Buckley et al. |
| 2006/0286984 A1 | 12/2006 | Bonner |
| 2007/0189489 A1* | 8/2007 | Carnazza et al. ......... 379/211.02 |
| 2009/0299934 A1* | 12/2009 | Horvitz et al. .................. 706/45 |
| 2010/0191820 A1* | 7/2010 | Daniell et al. ................. 709/206 |

FOREIGN PATENT DOCUMENTS

| | | | |
|---|---|---|---|
| EP | 1223781 A2 | 7/2002 | |
| EP | 1225752 A2 | 7/2002 | ............. H04M 3/51 |
| EP | 1329810 A1 | 7/2003 | ................ G06F 9/46 |
| EP | 1459508 A1 | 9/2004 | |
| WO | 9826566 A1 | 6/1998 | |
| WO | WO 99/17194 | 4/1999 | ................ G06F 9/46 |
| WO | WO 99/34628 | 7/1999 | ............... H04Q 7/22 |
| WO | 00/79813 A1 | 12/2000 | |
| WO | 0135615 A2 | 5/2001 | |
| WO | 02095630 A1 | 11/2002 | |
| WO | 03/019884 A1 | 3/2003 | |
| WO | 03056799 A1 | 7/2003 | |
| WO | 03058921 A2 | 7/2003 | |
| WO | 2004028114 A2 | 4/2004 | |
| WO | 2004057816 A1 | 7/2004 | |

OTHER PUBLICATIONS

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Day, M. et al., "A Model for Presence and Instant Messaging," IETF Request for Comments No. 2778, Feb. 2000, pp. 1-17.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

Rosenberg, J. and Schulzrinne, H., "draft-rosenberg-sip-pip.00.txt: SIP for Presence," IETF Internet Draft, Nov. 13, 1998, pp. 1-22, XP002325320.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for related application PCT/US02/40882, mailed Oct. 8, 2003.

International Search Report for related application PCT/IB03/03994, mailed Mar. 30, 2004.

International Search Report for related application PCT/IB03/04250, mailed Jan. 1, 2004.

International Search Report for related application PCT/IB03/05780, mailed Jan. 27, 2005.

International Search Report for related application PCT/IB03/06073, mailed May 4, 2004.

European Search Report for related application EP 03257957, mailed Aug. 17, 2005.

International Search Report for PCT/IB03/03962, mailed Jan. 28, 2004.

(56) References Cited

OTHER PUBLICATIONS

International Search Report for PCT/IB02/05523 mailed Apr. 15, 2003.
European search report for application No. 07012474.8, completed Sep. 28, 2007.
A Report on the Status of Wireless Access to 2-1-1, Mar. 2003, by Stover and Cunningham pp. 8-10.
Crocker, D. et al., "A Common Profile for Instant Messaging (CPIM)," Network Working Group: Internet Draft, Nov. 2000, 75 pages, http://tools.ietf.org/html/draft-ietf-impp-cpim-01.
Day, M. et al., "Instant Messaging/Presence Protocol Requirements," Network Working Group: Request for Comment (RFC): 2779, Feb. 2000, 53 pages, http://tools.ietf.org/html/rfc2779.
Handley, M. et al., "SIP: Session Initiation Protocol," Network Working Group: Request for Comments (RFC): 2543, Mar. 1999, 153 pages.
Rivera, Krisela et al., "The Effect of Emotional Icons on Remote Communications," CHI 96 Interactive Posters, Apr. 13-18, 1996, pp. 99-100.
Advisory Action for U.S. Appl. No. 10/034,431, mailed Nov. 22, 2005, 3 pages.
Examiner's Answer to Appeal Brief for U.S. Appl. No. 10/034,431, mailed Aug. 23, 2007, 13 pages.
Examiner's Answer to Appeal Brief for U.S. Appl. No. 10/034,431, mailed Jun. 16, 2006, 11 pages.
Examiner's Answer to Appeal Brief for U.S. Appl. No. 10/034,431, mailed Mar. 17, 2010, 4 pages.
Final Office Action for U.S. Appl. No. 10/034,431, mailed Sep. 6, 2005, 9 pages.
Non-Final Office Action for U.S. Appl. No. 10/034,431, mailed Mar. 1, 2005, 9 pages.
Non-Final Office Action for U.S. Appl. No. 10/034,431, mailed Jan. 8, 2014, 14 pages.
Advisory Action for U.S. Appl. No. 10/034,429, mailed Aug. 6, 2007, 3 pages.
Advisory Action for U.S. Appl. No. 10/034,429, mailed Jan. 3, 2006, 3 pages.
Advisory Action for U.S. Appl. No. 10/034,429, mailed Oct. 8, 2008, 3 pages.
Final Office Action for U.S. Appl. No. 10/034,429, mailed Jul. 25, 2008, 12 pages.
Final Office Action for U.S. Appl. No. 10/034,429, mailed Jun. 29, 2009, 13 pages.
Final Office Action for U.S. Appl. No. 10/034,429, mailed May 15, 2007, 13 pages.
Final Office Action for U.S. Appl. No. 10/034,429, mailed Oct. 20, 2005, 13 pages.
Non-Final Office Action for U.S. Appl. No. 10/034,429, mailed Apr. 24, 2006, 12 pages.
Non-Final Office Action for U.S. Appl. No. 10/034,429, mailed Apr. 27, 2005, 11 pages.
Non-Final Office Action for U.S. Appl. No. 10/034,429, mailed Nov. 13, 2008, 11 pages.
Non-Final Office Action for U.S. Appl. No. 10/034,429, mailed Nov. 16, 2006, 12 pages.
Non-Final Office Action for U.S. Appl. No. 10/034,429, mailed Sep. 7, 2007, 10 pages.
Advisory Action for U.S. Appl. No. 10/036,247, mailed Dec. 27, 2005, 3 pages.
Final Office Action for U.S. Appl. No. 10/036,247, mailed Aug. 25, 2005, 15 pages.
Non-Final Office Action for U.S. Appl. No. 10/036,247, mailed Apr. 28, 2005, 13 pages.
Non-Final Office Action for U.S. Appl. No. 10/036,247, mailed Nov. 1, 2006, 5 pages.
Notice of Allowance for U.S. Appl. No. 10/036,247, mailed Jul. 12, 2007, 4 pages.
Advisory Action for U.S. Appl. No. 10/079,237, mailed Feb. 9, 2006, 3 pages.
Advisory Action for U.S. Appl. No. 10/079,237, mailed Oct. 6, 2008, 7 pages.
Examiner's Answer to Appeal Brief for U.S. Appl. No. 10/079,237, mailed Feb. 23, 2010, 9 pages.
Examiner's Answer to Appeal Brief for U.S. Appl. No. 10/079,237, mailed Feb. 25, 2010, 10 pages.
Final Office Action for U.S. Appl. No. 10/079,237, mailed Jul. 16, 2008, 11 pages.
Final Office Action for U.S. Appl. No. 10/079,237, mailed May 12, 2009, 9 pages.
Final Office Action for U.S. Appl. No. 10/079,237, mailed Nov. 17, 2005, 9 pages.
Non-Final Office Action for U.S. Appl. No. 10/079,237, mailed Dec. 26, 2007, 7 pages.
Non-Final Office Action for U.S. Appl. No. 10/079,237, mailed Dec. 27, 2004, 9 pages.
Non-Final Office Action for U.S. Appl. No. 10/079,237, mailed Jan. 11, 2007, 7 pages.
Non-Final Office Action for U.S. Appl. No. 10/079,237, mailed Jul. 28, 2006, 4 pages.
Non-Final Office Action for U.S. Appl. No. 10/079,237, mailed Jul. 6, 2007, 7 pages.
Non-Final Office Action for U.S. Appl. No. 10/079,237, mailed Jun. 16, 2005, 8 pages.
Non-Final Office Action for U.S. Appl. No. 10/079,237, mailed Nov. 26, 2008, 8 pages.
Notice of Allowance for U.S. Appl. No. 10/079,237, mailed May 23, 2013, 6 pages.
Advisory Action for U.S. Appl. No. 10/100,703, mailed Apr. 1, 2005, 3 pages.
Advisory Action for U.S. Appl. No. 10/100,703, mailed Jan. 19, 2006, 3 pages.
Final Office Action for U.S. Appl. No. 10/100,703, mailed Jan. 14, 2005, 4 pages.
Final Office Action for U.S. Appl. No. 10/100,703, mailed Oct. 19, 2005, 5 pages.
Non-Final Office Action for U.S. Appl. No. 10/100,703, mailed Jun. 29, 2006, 5 pages.
Non-Final Office Action for U.S. Appl. No. 10/100,703, mailed May 20, 2004, 4 pages.
Non-Final Office Action for U.S. Appl. No. 10/100,703, mailed May 6, 2005, 5 pages.
Notice of Allowance for U.S. Appl. No. 10/100,703, mailed Jan. 17, 2007, 4 pages.
Supplemental Notice of Allowability for U.S. Appl. No. 10/100,703, mailed Apr. 12, 2007, 2 pages.
Supplemental Notice of Allowability for U.S. Appl. No. 10/100,703, mailed Feb. 28, 2007, 2 pages.
Notice of Allowability for U.S. Appl. No. 10/101,286, mailed Aug. 11, 2003, 4 pages.
Advisory Action for U.S. Appl. No. 10/119,923, mailed Nov. 29, 2004, 3 pages.
Final Office Action for U.S. Appl. No. 10/119,923, mailed Sep. 13, 2004, 10 pages.
Non-Final Office Action for U.S. Appl. No. 10/119,923, mailed Feb. 23, 2005, 7 pages.
Non-Final Office Action for U.S. Appl. No. 10/119,923, mailed Feb. 6, 2004, 7 pages.
Notice of Allowance for U.S. Appl. No. 10/119,923, mailed Aug. 5, 2005, 7 pages.
Notice of Allowance for U.S. Appl. No. 10/119,923, mailed Jan. 12, 2006, 4 pages.
Supplemental Notice of Allowability for U.S. Appl. No. 10/119,923, mailed Jun. 16, 2006, 2 pages.
Supplemental Notice of Allowability for U.S. Appl. No. 10/119,923, mailed Mar. 8, 2006, 2 pages.
Advisory Action for U.S. Appl. No. 10/245,476, mailed Jan. 29, 2008, 3 pages.
Board of Patent Appeals and Interferences Decision on Appeal concerning U.S. Appl. No. 10/245,476, mailed Oct. 18, 2011, 7 pages.
Examiner's Answer to Appeal for U.S. Appl. No. 10/245,476, mailed Jun. 11, 2008, 27 pages.

(56) References Cited

OTHER PUBLICATIONS

Final Office Action for U.S. Appl. No. 10/245,476, mailed Nov. 16, 2007, 25 pages.
Final Office Action for U.S. Appl. No. 10/245,476, mailed Oct. 20, 2006, 24 pages.
Non-Final Office Action for U.S. Appl. No. 10/245,476, mailed Jan. 12, 2007, 24 pages.
Non-Final Office Action for U.S. Appl. No. 10/245,476, mailed Jun. 21, 2007, 24 pages.
Non-Final Office Action for U.S. Appl. No. 10/245,476, mailed May 4, 2006, 22 pages.
Advisory Action for U.S. Appl. No. 10/336,523, mailed Mar. 26, 2007, 4 pages.
Board of Patent Appeals and Interferences Decision on Appeal for U.S. Appl. No. 10/336,523, mailed Sep. 9, 2009, 14 pages.
Examiner's Answer to Appeal Brief for U.S. Appl. No. 10/336,523, mailed Oct. 30, 2007, 11 pages.
Final Office Action for U.S. Appl. No. 10/336,523, mailed Jan. 4, 2007, 10 pages.
Non-Final Office Action for U.S. Appl. No. 10/336,523, mailed Jun. 2, 2006, 7 pages.
Notice of Allowance for U.S. Appl. No. 10/336,523, mailed Dec. 15, 2009, 6 pages.
First Office Action for Canadian Patent Application 2,447,767, mailed Jul. 10, 2012, 14 pages.
Advisory Action for U.S. Appl. No. 10/262,393, mailed May 4, 2005, 3 pages.
Final Office Action for U.S. Appl. No. 10/262,393, mailed Feb. 23, 2005, 6 pages.
Final Office Action for U.S. Appl. No. 10/262,393, mailed Jan. 25, 2008, 5 pages.
Final Office Action for U.S. Appl. No. 10/262,393, mailed Jul. 24, 2006, 6 pages.
Non-Final Office Action for U.S. Appl. No. 10/262,393, mailed Aug. 23, 2005, 5 pages.
Non-Final Office Action for U.S. Appl. No. 10/262,393, mailed Jan. 24, 2006, 6 pages.
Non-Final Office Action for U.S. Appl. No. 10/262,393, mailed Jul. 7, 2004, 4 pages.
Non-Final Office Action for U.S. Appl. No. 10/262,393, mailed Jul. 9, 2007, 7 pages.
Notice of Allowance for U.S. Appl. No. 10/262,393, mailed Feb. 23, 2009, 7 pages.
Supplemental Notice of Allowability for U.S. Appl. No. 10/262,393, mailed May 15, 2009, 3 pages.
Advisory Action for U.S. Appl. No. 10/247,591, mailed Jan. 9, 2009, 6 pages.
Final Office Action for U.S. Appl. No. 10/247,591, mailed Jul. 14, 2006, 12 pages.
Final Office Action for U.S. Appl. No. 10/247,591, mailed Oct. 21, 2008, 14 pages.
Non-Final Office Action for U.S. Appl. No. 10/247,591, mailed Apr. 19, 2007, 12 pages.
Non-Final Office Action for U.S. Appl. No. 10/247,591, mailed Apr. 7, 2008, 13 pages.
Non-Final Office Action for U.S. Appl. No. 10/247,591, mailed Jan. 6, 2006, 11 pages.
Non-Final Office Action for U.S. Appl. No. 10/247,591, mailed Nov. 2, 2006, 12 pages.
Non-Final Office Action for U.S. Appl. No. 10/247,591, mailed Oct. 9, 2007, 11 pages.
Advisory Action for U.S. Appl. No. 10/325,144, mailed Mar. 5, 2007, 15 pages.
Final Office Action for U.S. Appl. No. 10/325,144, mailed Dec. 18, 2006, 12 pages.
Non-Final Office Action for U.S. Appl. No. 10/325,144, mailed Jul. 3, 2006, 8 pages.
International Search Report and Written Opinion for PCT/IB2006/002542, mailed Feb. 28, 2007, 15 pages.
Extended European Search Report for European Patent Application 11164208.8, mailed Nov. 21, 2011, 6 pages.
Summons to attend Oral Proceedings for European Patent Application No. 03257957.5, mailed Jan. 31, 2014, 5 pages.
Final Office Action for U.S. Appl. No. 10/034,431, mailed Jun. 27, 2014, 18 pages.
Decision to Refuse European Patent Application No. 03257957.5, mailed Jul. 1, 2014, 9 pages.
Non-Final Office Action for U.S. Appl. No. 14/142,303, mailed Oct. 1, 2014, 9 pages.
Examiner's Report for Canadian Patent Application No. 2,447,767, mailed Feb. 10, 2015, 5 pages.

* cited by examiner

PRESENCE REPORTING USING WIRELESS MESSAGING

FIELD OF THE INVENTION

The present invention relates to mobile communications, and in particular to allowing a single mobile terminal, which is capable of communicating over cellular wireless networks as well as the wireline networks through supporting wireless interfaces, to report presence information using a messaging service.

BACKGROUND OF THE INVENTION

Today's telephony users generally have at least one wireline-based telephone terminal receiving services through the public switched telephone network (PSTN) and a mobile terminal receiving services through a cellular network. These wireline and mobile terminals are incompatible, and thus incapable of facilitating communications over both the cellular network and PSTN. As such, telephony users must juggle multiple telephone terminals, using one terminal to make and receive calls via the cellular network, and another to make and receive calls via the PSTN. Further, callers are often forced to attempt calls to numerous directory numbers prior to reaching a desired user or leaving a voicemail for the user.

To address these issues, communication technology is advancing to a point where specially configured mobile terminals can communicate via the cellular network, as well as the PSTN or a data access network through a terminal adaptor. The terminal adaptor may be coupled to the PSTN or data access network and communicates wirelessly with the mobile terminal using local wireless access technology, such as traditional analog and digital cordless technologies, 802.11 wireless local area network technologies, and Bluetooth technology. Notably, the mobile terminal may be permanently or temporarily associated with one address, such as a directory number, for cellular access, and another for PSTN or data access.

To route the incoming calls to the mobile terminal, a call control entity, generally referred to as a service node, is used to control the routing of incoming calls directed to the mobile terminal either through the cellular network or through the PSTN or data access network via a terminal adaptor. To assist in such call routing, the service node needs information bearing on whether the mobile terminal is within a zone in which communications with the terminal adaptor is possible. As such, there is need for an efficient and effective way to provide the service node with information bearing on whether incoming calls should be routed directly to the mobile terminal via the cellular network or indirectly through the PSTN or data access network using a terminal adaptor.

SUMMARY OF THE INVENTION

The present invention provides for the delivery of presence information to a service node from a mobile terminal using a messaging service, such as the short messaging service. The mobile terminal is configured to communicate via a cellular network as well as via a terminal adaptor, which is coupled to a wireline telephony switch or a data access network to support telephony communications. A local wireless interface is provided between the mobile terminal and the terminal adaptor to support communications through the terminal adaptor. In operation, the mobile terminal will provide a messaging service message including presence information to the service node, wherein the presence information will bear on the ability of the mobile terminal to communicate with the terminal adaptor, and thus, facilitate communications through the terminal adaptor.

In one embodiment, when the mobile terminal and terminal adaptor can communicate through the local wireless interface, a messaging service message is sent to the service node either through the cellular network via traditional techniques or via the terminal adaptor to alert the service node that incoming calls should be routed to the mobile terminal via the terminal adaptor. When the mobile terminal and the terminal adaptor are not able to communicate with one another, the mobile terminal will send the messaging service message to the service node, wherein the presence information therein will cause the service node to route incoming calls to the mobile terminal through the cellular network. Messaging service messages may be provided to the service node on a periodic basis to provide the presence information, or when the ability of the mobile terminal to communicate with the terminal adaptor changes.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
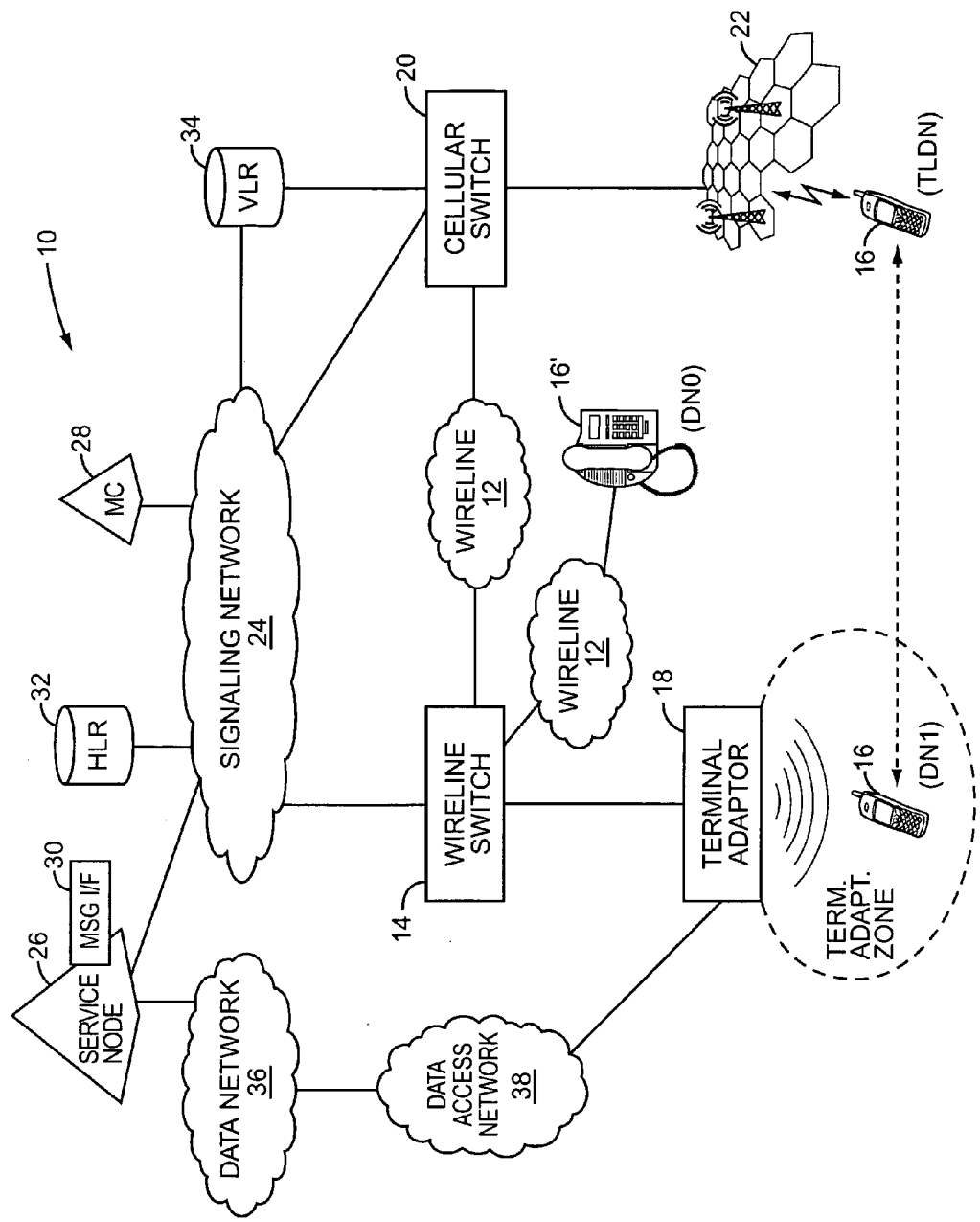
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing a mobile terminal that is capable of communication via a cellular-based wireless network, as well as via the public switched telephone network or data network (wireline networks) through a terminal adaptor. The terminal adaptor is coupled to the wireline network in traditional fashion, and communicates wirelessly with the mobile terminal using local wireless access technology, such as traditional analog and digital cordless technologies, 802.11 wireless local area network technologies, Digital European Cordless Telephone (DECT) technology, and Bluetooth technology. Communications between the mobile terminal and the wireless network can use any available cellular access technology, such as time division multiple access (TDMA), code division multiple access (CDMA), and orthogonal frequency division multiple access (OFDM). The mobile terminal may be associated with one directory number for both wireless network access and wireline network access or different numbers for access to the respective networks.

In addition to connecting to the wireline network and providing wireless access for the mobile terminal, the terminal adaptor may have a data interface through which the terminal adaptor can communicate with a service node, which controls the routing of incoming calls directed to the mobile terminal. Depending on the configuration, the terminal adaptor, mobile terminal, or the user may determine whether incoming calls are routed through the wireless network or the wireline network, when the mobile terminal is within a communication zone in which communication via the local wireless access technology is possible. The mobile terminal can provide presence information to the service node bearing on whether it is within or outside of the communication zone associated with the terminal adaptor. The presence information may be delivered to the service node using a messaging service, such as the Short Message Service (SMS), associated with the wireless network. The service node may take this information, alone or in light of other presence information, and direct incoming calls through the wireline network when the mobile terminal is within the terminal adaptor zone and such routing is desired, and direct calls through the wireless network when the mobile terminal is outside of the terminal adaptor zone or when wireless network routing is desired. Accordingly, the present invention uses a messaging service to help provide presence information to the service node, which will effectively route calls through the wireless network or through the wireline network to the terminal adaptor, based at least in part on the presence information. The wireless network may be based on technology such as TDMA, CDMA, UMTS, OFDM, and GSM.

With reference to FIG. 1, a communication environment 10 is illustrated as including a wireline network 12 associated with a wireline switch 14 indirectly supporting a mobile terminal 16, which is associated with a user. For the present invention, the user will have a terminal adaptor 18, which interfaces with the wireline switch 14 and facilitates local wireless communications with the user's mobile terminal 16. Accordingly, for an incoming or outgoing call via the wireline switch 14, the terminal adaptor 18 may provide a circuit-switched interface to the wireline switch 14 and a wireless interface to the mobile terminal 16, wherein the mobile terminal 16 operates analogously to a traditional cordless residential telephone in association with the terminal adaptor 18. The terminal adaptor 18 may be configured to support multiple mobile terminals 16.

The wireline network 12 is also coupled to a cellular switch 20 associated with a cellular network. The cellular switch 20 is coupled to a network of base stations 22 for supporting cellular communications with the mobile terminal 16. The mobile terminal 16 will have multiple modes of operation, wherein one mode facilitates wireless communications via the network of base stations 22 and another mode facilitates communications with the terminal adaptor 18. In general, communications with the terminal adaptor 18 are of limited range, and are generally referred to as local wireless communications, wherein the communications via the base stations 22 are much broader and limited only to the extent of the cellular network. Call signaling for the wireline network 12 and cellular network is predominantly controlled via a signaling network 24, which may include the Signaling System 7 (SS7) network. Both the wireline and cellular switches 14, 20 may be implemented using circuit-switched or packet-based technology. For the present invention, a service node 26 is provided in association with the signaling network 24 and is capable of communicating directly or indirectly with both the wireline switch 14 and the cellular switch 20 to gather information pertaining to incoming calls, as well as providing instructions for routing these calls to the mobile terminal 16 through the wireline switch 14 or an appropriate cellular switch 20.

In one embodiment, the service node 26 is configured to communicate with one or more messaging centers (MCs) 28, which may take the form of a short message service center (SMSC). The messaging centers 28 are capable of cooperating with the various cellular switches 20 to facilitate the delivery of short message service (SMS) messages (or multimedia message services (MMS) messages) between the mobile terminal 16 and other terminals (not shown) in traditional fashion. The service node 26 is configured to include a messaging interface (MSG. I/F) 30, which appears as a messaging center to the messaging centers 28 and other entities in the communication environment 10 participating in the messaging service. The messaging interface 30 may be associated with a service node address to which SMS messages may be routed from the mobile terminal 16 to the service node 26 via the supporting cellular switch 20 and, if necessary, via one or more messaging centers 28. As described further below, the mobile terminal 16 is adapted to send SMS messages to the service node address to provide presence information bearing on whether communications with the mobile terminal 16 via the terminal adaptor 18 or via the cellular network are appropriate. The SMS message may also include identification indicia sufficient to allow the service node 26 to identify the origin (mobile terminal 16) of the SMS message. The identification indicia may be a directory number associated with the mobile terminal 16, a mobile terminal identification number (MIN), or other identifier of the user or mobile terminal 16.

The wireless interface provided by the terminal adaptor 18 will have a limited range, and as such, will provide a terminal adaptor zone, which defines an area or range in which local communications between the terminal adaptor 18 and the mobile terminal 16 are possible. The mobile terminal 16, through a variety of possible techniques, may determine whether it is within the terminal adaptor zone, and provide presence information bearing on the relative location of the mobile terminal 16 with respect to the terminal adaptor 18 through the cellular network to the service node 26. The presence of the mobile terminal 16 within the terminal adaptor zone may be determined based on monitoring signal levels, bit error rates, or other indicia indicative of the ability of the terminal adaptor 18 and the mobile terminal 16 to communicate with each other. Further, the terminal adaptor 18 may be configured to transmit to the presence information bearing on whether the mobile terminal 16 is within the terminal adaptor zone.

In one embodiment, the service node 26 may communicate with the terminal adaptor 18 through a data network 36, such as the Internet, via a data access network 38. Such communication may take place via data access customer premise equipment (CPE), which is not shown. The data access CPE may be a cable modem, DSL modem, ISDN modem, DS1/E1 termination, fiber termination, or like communication terminal that provides access to the data network 36 via the corresponding cable network, DSL network, or IDSN forming the data access network 38. In an alternative embodiment, the wireline switch 14 can be a packet switch. As such, the terminal adaptor 18 may facilitate communications via the data access network 38 instead of via a direct circuit-switched interface. Preferably, communications with the wireline switch 14 use Intelligent Network (IN) signaling, and communications with the terminal adaptor 18 are implemented using the Session Initiation Protocol (SIP); however, those skilled in the art will recognize the applicability of alternative signaling technologies and protocols. In an exemplary embodiment, incoming calls to the wireline network directory number (DN1) associated with the mobile terminal 16 are routed to the wireline switch 14, which is provisioned to access the service node 26 to determine how to further route the call for termination. The service node 26 will receive a message from the wireline switch 14 identifying the directory number (DN1) associated with the called party (user) for the incoming call. From the directory number, the service node 26 will recognize that the directory number is the directory number associated with the mobile terminal 16. The service node 26 will determine whether to route the call to the mobile terminal 16 via the terminal adaptor 18 and wireline switch 14, or via the cellular switch 20. If the call is to be routed to the terminal adaptor 18, the service node 26 will send a message to the wireline switch 14 directing the wireline switch 14 to route the incoming call to the mobile terminal 16 via the terminal adaptor 18. If the service node 26 determines that the incoming call should be routed via the cellular network, the service node 26 will instruct the wireline switch 14 to route the call to the mobile terminal 16 through the cellular network via the cellular switch 20. In the present invention, the service node 26 will receive SMS messages containing presence information from the mobile terminal 16 wherein the presence information is used to help determine how to route the incoming call.

A home location register (HLR) 32 may be provided in association with the wireline switch 14. The HLR 32 is analogous to HLRs found in cellular networks, and is configured to cooperate with visiting location registers (VLRs) 34 of the cellular network. The interplay between the HLR 32 and the VLRs 34 will allow calls to be directed to the mobile terminal 16 via the wireline switch 14 to the terminal adaptor 18 or via the cellular switch 20 without requiring the mobile terminal 16 to be associated with different directory numbers for the different networks. The primary directory number associated with the mobile terminal 16 is a wireline network directory number. A temporary directory number, which does not need to be known by calling parties, will be provided by the VLR 34 or other entity in the cellular network to assist in routing calls to the mobile terminal 16 via the cellular switch 20. In other embodiments, the mobile terminal 16 may be associated with one directory number for wireline network access and another directory number for wireless network access.

Figure 2:
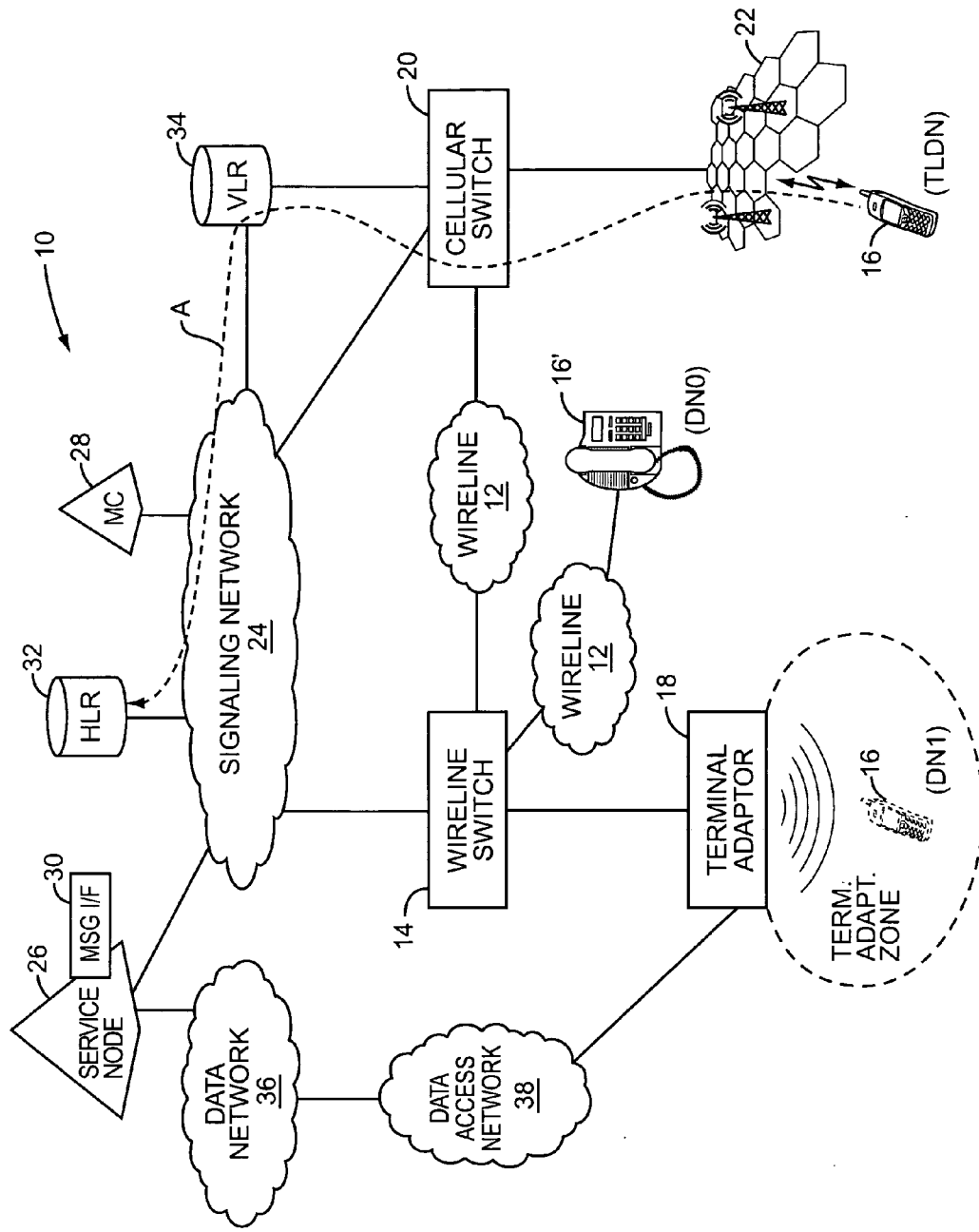
FIG. 2 illustrates a wireless registration process for a mobile terminal according to one embodiment of the present invention.
Figure 3:
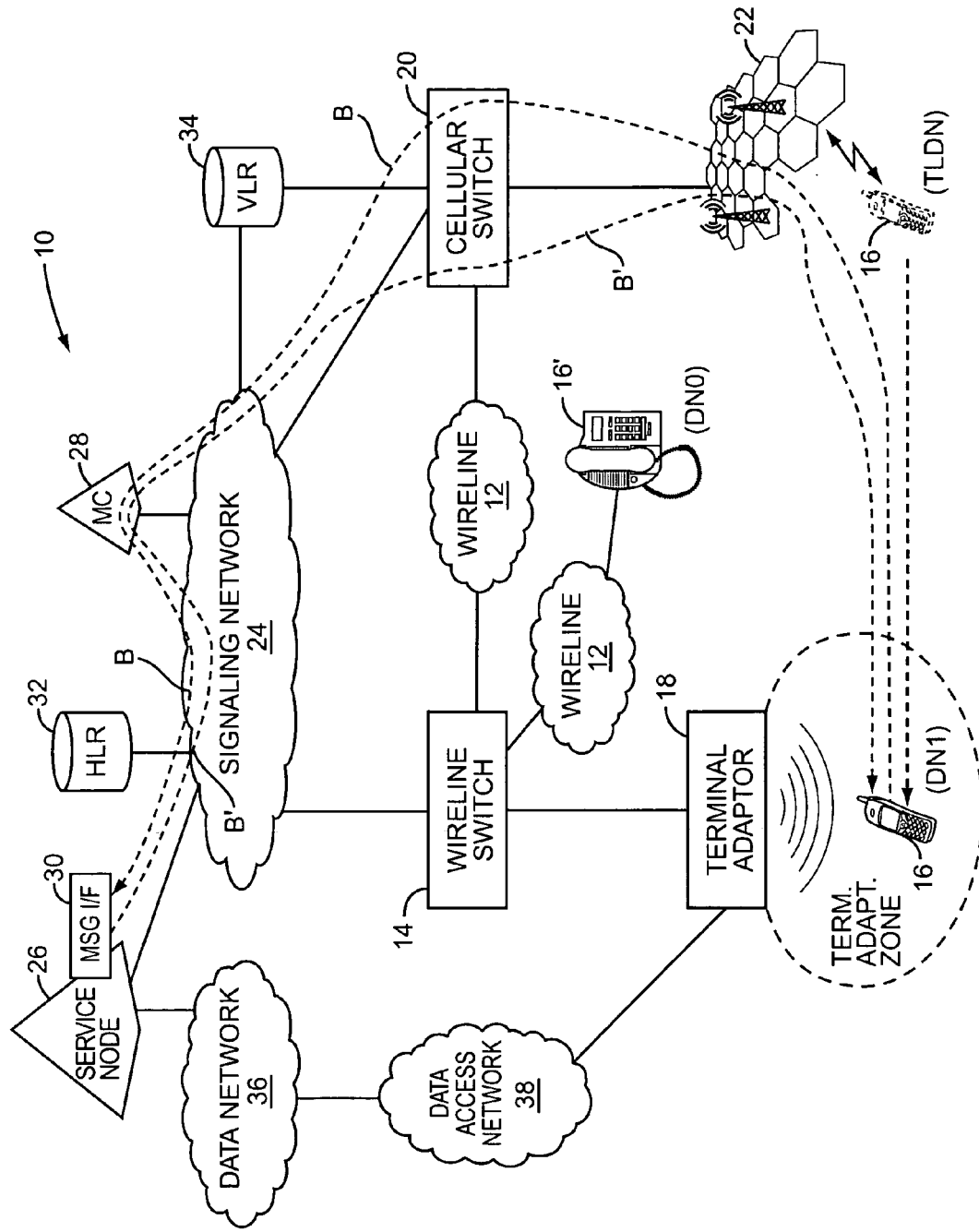
FIG. 3 illustrates a basic presence reporting process for a mobile terminal to receive service via a wireline switch according to one embodiment of the present invention.

Reference is now made to FIGS. 2 through 7 in general, and FIG. 2 in particular. To operate in the cellular network, the mobile terminal 16 will register its presence in the cellular network with the HLR 32 via the local VLR 34 and cellular switch 20 in traditional fashion (Step A). Turning now to FIG. 3, assume the mobile terminal 16 moves into the terminal adaptor zone. Upon detecting an ability to communicate with the terminal adaptor 18, the mobile terminal 16 will create an SMS message including identification information for the mobile terminal 16 and presence information indicating that the mobile terminal 16 is within the terminal adaptor zone or that it can otherwise communicate with the terminal adaptor 18. The SMS message is then sent to an address, such as a dedicated service node directory number, which associated with the messaging interface 30 of the service node 26 (Step B). The dedicated service node directory number may be a mobile subscriber integrated services digital network (MSISDN) number. The SMS message may be routed by the cellular switch 20 to the messaging center 28, which will forward the SMS message to the messaging interface 30 directly or via other messaging interfaces (not shown). Depending on the relative locations of the cellular switch 20 and the service node 26, the cellular switch 20 may route the SMS message directly to the messaging interface 30. Upon receipt of the SMS message, the presence information is processed by the service node 26 to assist in routing or otherwise processing incoming calls intended for the mobile terminal 16. The service node 26 may send an SMS message to the mobile terminal 16 confirming the reception of the SMS message containing the presence information (Step B')

Figure 4:
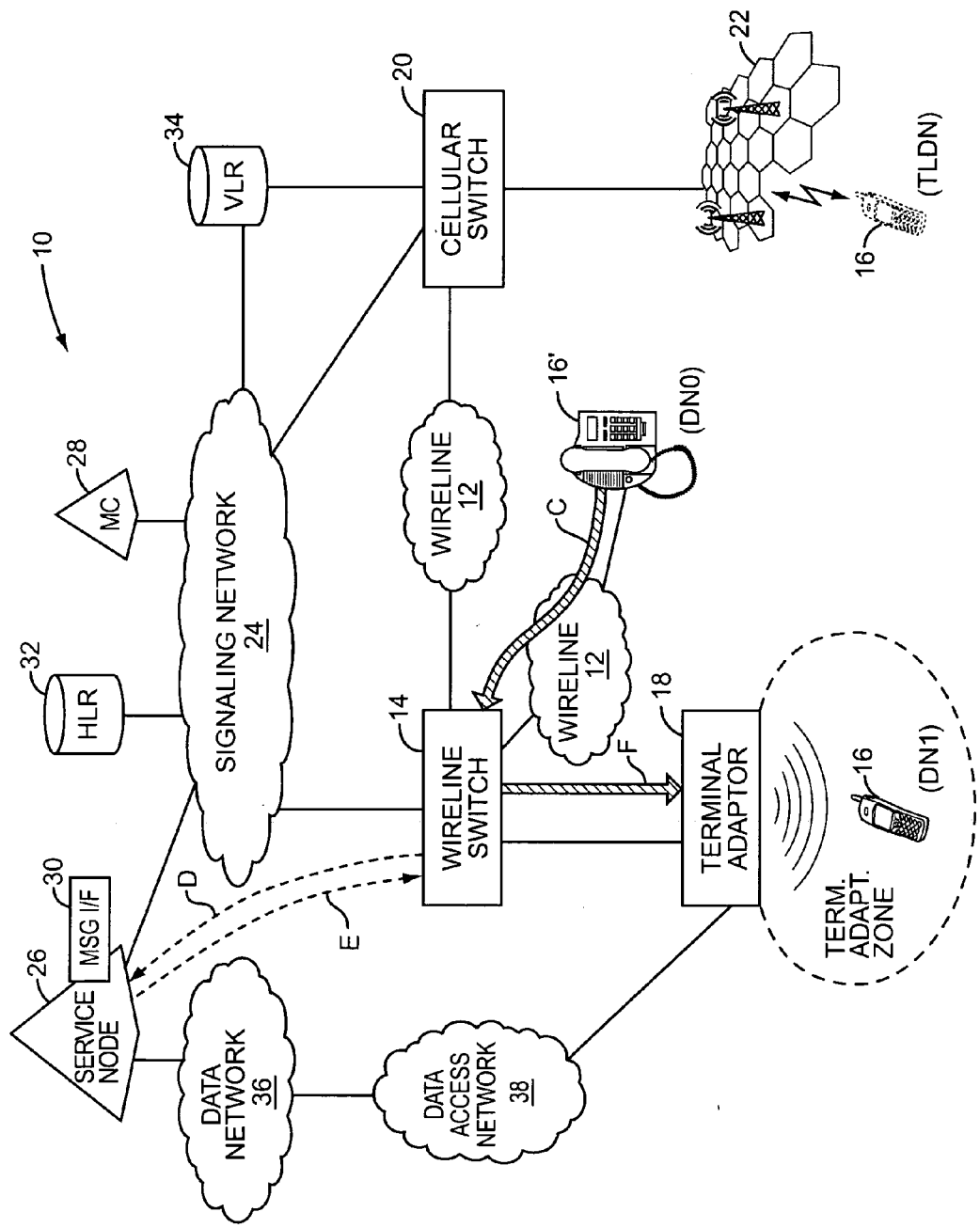
FIG. 4 illustrates the routing of an incoming call for termination via the wireline switch according to one embodiment of the present invention.

In operation, all incoming calls intended for the mobile terminal 16 are initially routed to the wireline switch 14. It is known by the wireline network 12 and associated networks that the directory number (DN1) is associated with the wireline switch 14. Thus, as illustrated in FIG. 4, when a remote terminal 16' initiates a call to the mobile terminal 16, the call is initially routed to the wireline switch 14 (step C). The wireline switch 14 is provisioned to send a request to the service node 26 for instructions on how to route the incoming call (step D). Based at least in part on the presence information provided by the mobile terminal 16 via the SMS message, the service node 26 will recognize that the incoming call should be directed to the mobile terminal 16 via the terminal adaptor 18, and will provide such instruction to the wireline switch 14 (step E). The wireline switch 14 will then take the necessary steps to connect the incoming call to the terminal adaptor 18 (step F), which will cooperate with the mobile terminal 16 to facilitate bi-directional communications for the parties participating in the call.

Figure 5:
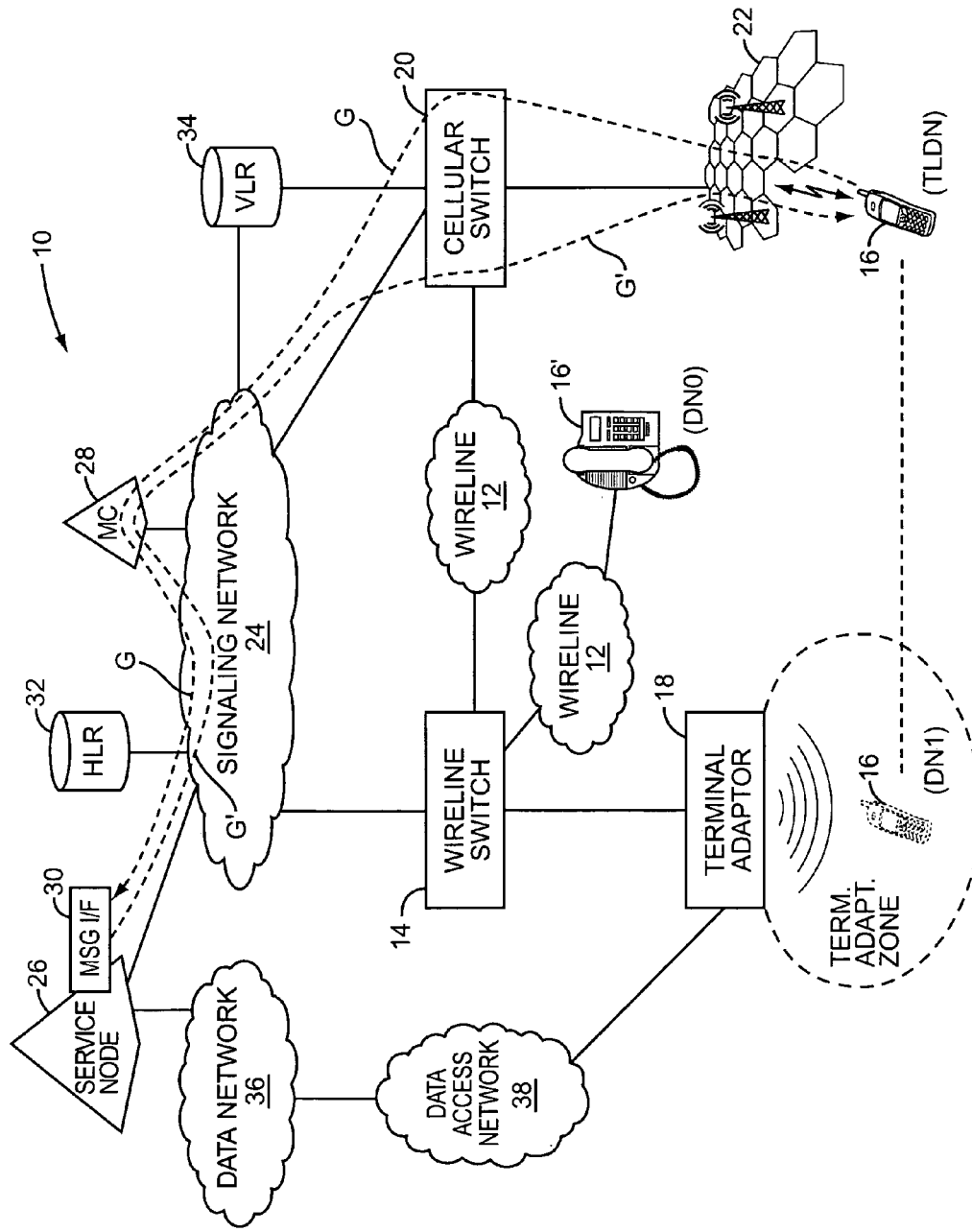
FIG. 5 illustrates a basic presence reporting process for a mobile terminal to receive service via a cellular switch according to one embodiment of the present invention.

With reference to FIG. 5, when the mobile terminal 16 moves outside of the terminal adaptor zone of the terminal adaptor 18 or the user provides appropriate instruction, the mobile terminal 16 will create an SMS message including identification information for the mobile terminal 16 and presence information indicating the mobile terminal 16 is not within the terminal adaptor zone or should not communicate with the mobile terminal 16 via the terminal adaptor 18. The SMS message is then sent to the dedicated service node directory number associated with the messaging interface 30 of the service node 26 (Step G). Again, the SMS message may be routed by the cellular switch 20 to the messaging center 28, which will forward the SMS message to the messaging interface 38 directly or via other messaging interfaces (not shown). Depending on the relative locations of the cellular switch 20 and the service node 26, the cellular switch 20 may route the SMS message directly to the messaging interface 30. Upon receipt of the SMS message, the presence information is processed by the service node 26 to assist in routing or otherwise processing incoming calls intended for the mobile terminal 16. The service node 26 may send an SMS message to the mobile terminal 16 in response to receiving the SMS message containing the presence information (Step G')

The mobile terminal 16 may be configured to provide periodic SMS messages with current presence information to the service node 26, in addition to or in lieu of providing SMS messages upon entering or leaving the terminal adaptor zone. Further, the user of the mobile terminal 16 can also manually force the switch from one access method to the other by providing appropriate instruction, and the mobile terminal 16 will send an SMS message to the service node 26 accordingly. In addition, the mobile terminal 16 can implement a form of hysteresis to limit the number of SMS messages sent if the user happens to be at the limit of the coverage area of the terminal adaptor 18, or is going in and out of the coverage area. The hysteresis algorithm may include waiting for the mobile terminal 16 to be close enough to the terminal adaptor 18 to be well within the coverage area before sending the SMS message.

Figure 6:
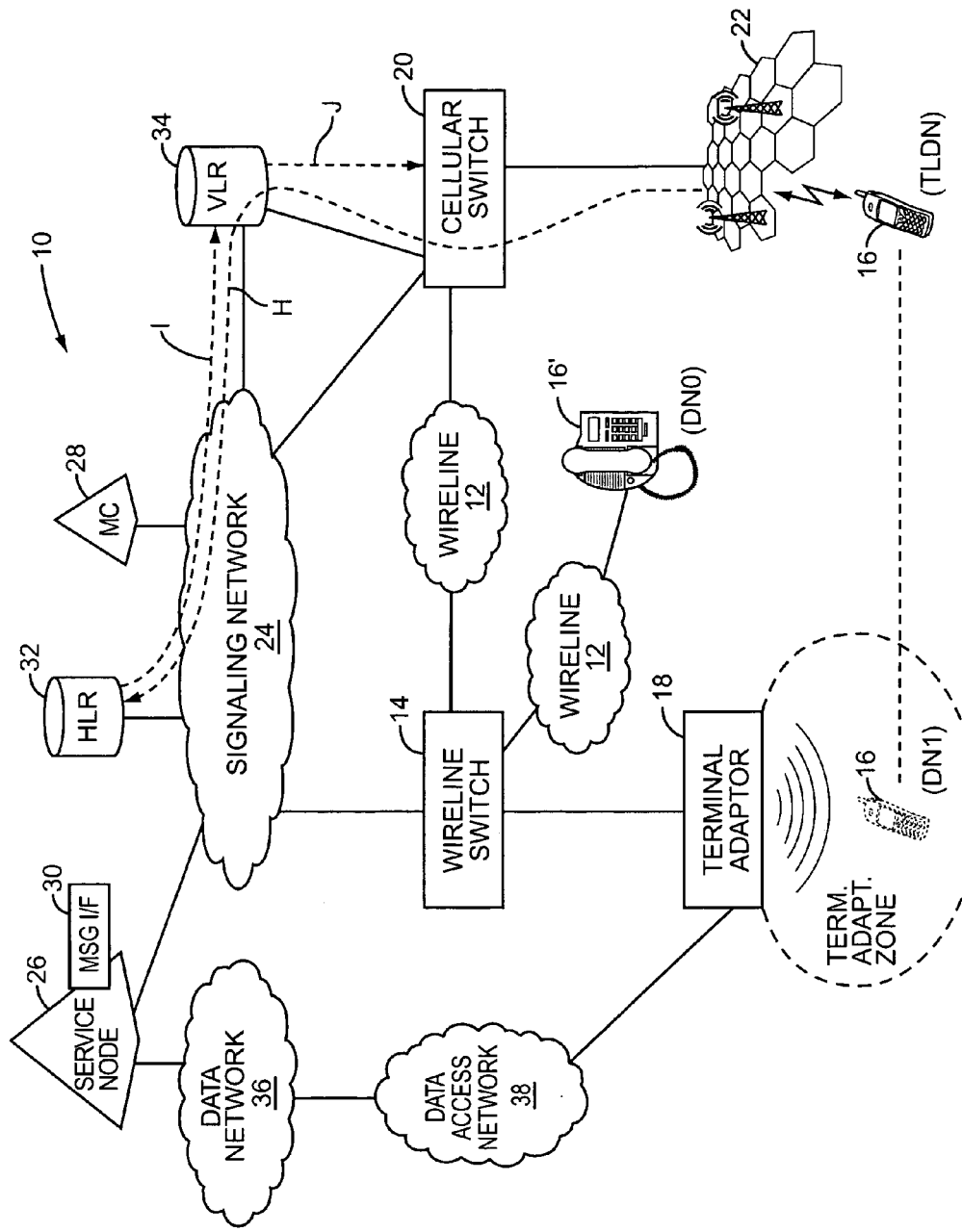
FIG. 6 illustrates a registration process for a mobile terminal for service via a cellular switch according to one embodiment of the present invention.

As the mobile terminal 16 enters the mode where communication is provided via the cellular network, the mobile terminal 16 should remain registered with the local cellular switch 20, the corresponding VLR 34, and the HLR 32. It may already be registered if the mobile terminal 16 was in an area where there was coverage by the cellular network (as illustrated with step A in FIG. 2). If not registered, the mobile terminal will register. Accordingly, as illustrated in FIG. 6, registration for cellular network access may begin with a registration message being sent to the HLR 32 via the cellular switch 20, directly or indirectly via the VLR 34 (step H). Typically, the HLR 32 will receive some form of mobile terminal identification, such as a mobile identification number (MIN). The HLR 32 will send a user profile associated with the mobile terminal 16 to the VLR 34 to support cellular service for the mobile terminal 16 (step I). The profile may then be forwarded to the cellular switch 20 (step J). At this point, the mobile terminal 16 is registered with the HLR 32, and the service node 26 knows to have incoming calls to directory number DN1 directed to the mobile terminal 16 via the cellular network based on the presence information provided in the latest SMS message.

Figure 7:
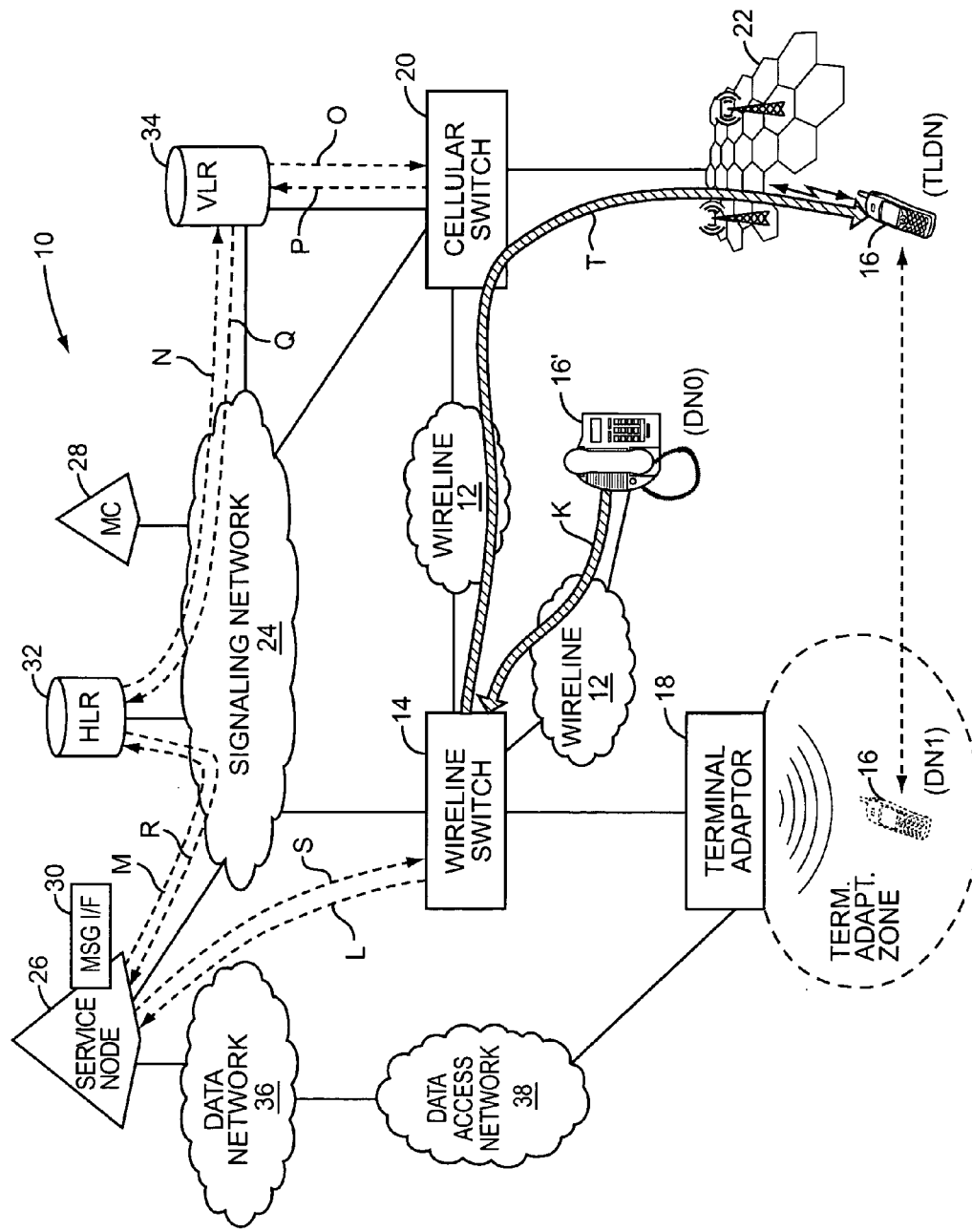
FIG. 7 illustrates the routing of an incoming call for termination via the cellular switch according to one embodiment of the present invention.

Turning now to FIG. 7, the process of routing a call to the mobile terminal 16 via the cellular network is illustrated. Initially, a call intended for directory number DN1 comes into the wireline switch 14 from telephony terminal 16' (step K). The wireline switch 14 is provisioned to recognize calls directed to directory number DN1 and request routing instructions from the service node 26 (step L). The service node 26 will recognize that incoming calls to the mobile terminal 16 should be routed via the cellular network, and will request routing information from the HLR 32 for the mobile terminal 16 (step M). In one embodiment, the routing information is provided in the form of a temporary local directory number (TLDN) provided by the cellular network. Accordingly, the HLR 32 will send a request for a TLDN to the VLR 34 (step N). The VLR 34 will request the TLDN for the mobile terminal 16 from the cellular switch 20 (step O), which will provide the TLDN to the VLR 34 (step P). The VLR 34 will then respond to the HLR 32 with the TLDN (step Q). The HLR 32 will forward the TLDN to the service node 26 (step R), which will send instructions to the wireline switch 14 to route the call to the TLDN (step S). At this point, the wireline switch 14 will route the incoming call to the cellular switch 20, which will facilitate a connection with the mobile terminal 16 via the base station network 22 in traditional fashion (step T).

Those skilled in the art will recognize that the telephony switches, wireline switch 14 and cellular switch 20, can be based on Time Division Multiplex (TDM) or packet technology. The wireline switch 14 can also be a Private Branch Exchange (PBX). In one embodiment, the wireline switch 14 provides a direct user interface to a user via a traditional telephony line, based on analog or digital technology, and can carry one or many simultaneous calls.

The service node 26 may also have the ability to perform rule-based or dynamic call routing in light of presence information received from other user devices in addition to the basic call routing as described above. The basic notions of rule-based or dynamic call routing are described in U.S. application Ser. No. 10/382,247 filed Mar. 5, 2003 entitled COMMON CALL ROUTING FOR MULTIPLE TELEPHONY DEVICES; U.S. application Ser. No. 10/443,369 filed May 22, 2003 entitled ADAPTIVE CALL ROUTING FOR MULTIPLE TELEPHONY TERMINALS; and U.S. application Ser. No. 10/723,831 filed Nov. 26, 2003 entitled CALL TRANSFER FOR AN INTEGRATED PACKET AND WIRELESS SERVICE USING A TEMPORARY DIRECTORY NUMBER, the disclosures of which are hereby incorporated by reference in their entireties. Further information on presence systems and the use of presence information to control communications to and from a user are described in U.S. application Ser. No. 10/100,703 filed Mar. 19, 2002 entitled MONITORING NATURAL INTERACTION FOR PRESENCE DETECTION; application Ser. No. 10/101,286 filed Mar. 19, 2002 entitled CUSTOMIZED PRESENCE INFORMATION DELIVERY; application Ser. No. 10/119,923 filed Apr. 10, 2002 entitled PRESENCE INFORMATION BASED ON MEDIA ACTIVITY; application Ser. No. 10/119,783 filed Apr. 10, 2002 entitled PRESENCE INFORMATION SPECIFYING COMMUNICATION PREFERENCES; and application Ser. No. 10/247,591 filed Sep. 19, 2003 entitled DYNAMIC PRESENCE INDICATORS, all currently pending, the disclosures of which are incorporated by reference herein in their entireties.

In addition to sending SMS messages to provide presence information to the service node 26 or other presence server via the cellular network, the SMS messages may be sent to the service node 26 through the terminal adaptor 18 and wireline switch 14. In such an embodiment, the messaging center 28 or messaging interface 30 will be equipped with a modem, which is adapted to communication with a modem on the terminal adaptor 18. The SMS message can be transferred to the messaging center 28 or the messaging interface 30 over a connection established by the wireline switch 14. If the message is initially received by the messaging center 28, then the messaging center 28 will forward the SMS message to the messaging interface 30 of the service node 26. Confirmatory replies may be provided in similar fashion.

Figure 8:
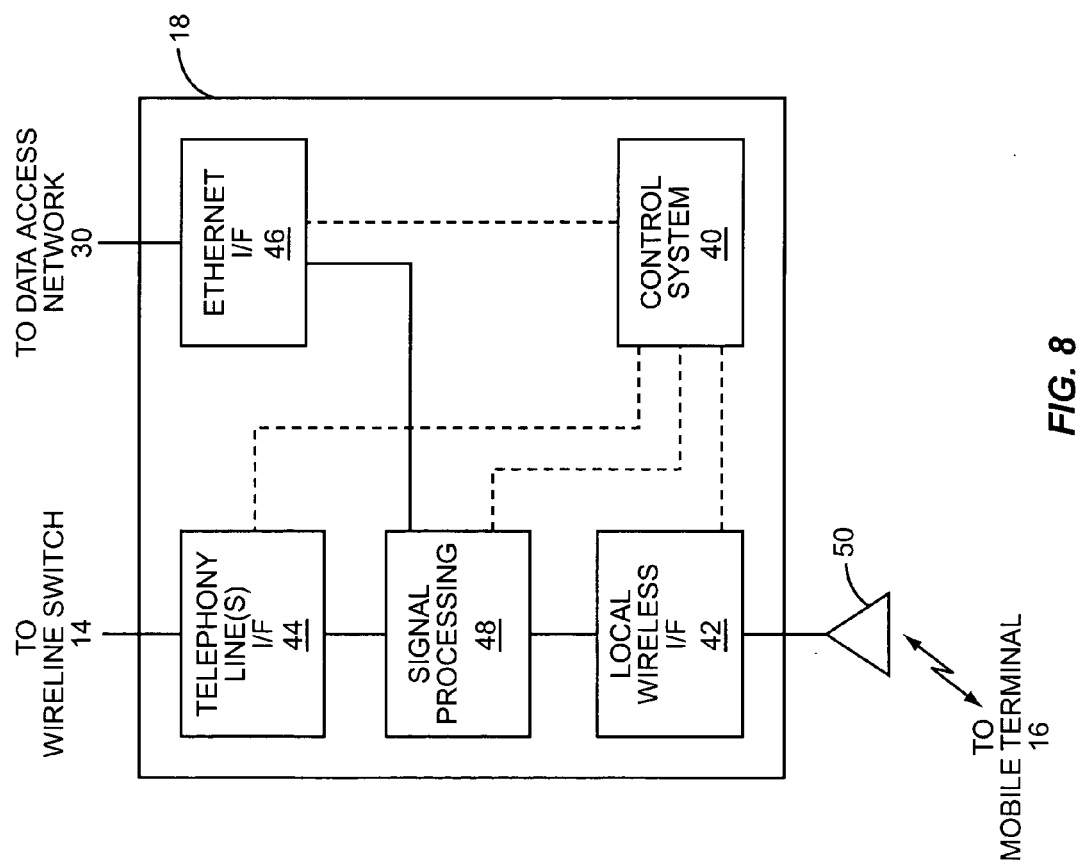
FIG. 8 is a block representation of a terminal adaptor according to one embodiment of the present invention.

A block representation of the terminal adaptor 18 is provided in FIG. 8. Preferably, the terminal adaptor 18 will include a control system 40 operatively associated with a local wireless interface 42, one or more telephony line interfaces 44, an optional Ethernet interface 46, and a signal processing function 48. The signal processing function 48 is part of the control system 40, and is capable of providing all the necessary coding, decoding, and conversions necessary for either of the telephony line interface 44 and Ethernet interface 46 to operate with the local wireless interface 42. The local wireless interface 42 is associated with an antenna 50, and is configured to communicate wirelessly with the mobile terminal 16 using any applicable wireless technology, such as traditional analog or digital cordless technology, wireless local area network technology, including 802.11-based technologies, DECT and Bluetooth technology. Clearly, the mobile terminal 16 must be equipped with a compatible interface and be configured to cooperate with the terminal adaptor 18 to facilitate normal telephone operation. As such, the terminal adaptor 18 and the mobile terminal 16 must cooperate such that the mobile terminal 16 knows when to ring, the terminal adaptor 18 knows when the mobile terminal 16 has been answered or ends a call, and the mobile terminal 16 receives any caller identification or SMS (or other) messaging intended for the user or necessary by the mobile terminal 16 for operation. Further, the local wireless interface 42, alone or in conjunction with the control system 40, may be able to periodically or continuously detect whether the mobile terminal 16 is within communication range, and thus within the terminal adaptor zone. Those skilled in the art will recognize numerous techniques for the mobile terminal 16, the terminal adaptor 18, or both to cooperate with one another to determine whether or not communications are possible or desired, based on analysis or user input via the mobile terminal 16. Again, the terminal adaptor 18 may support multiple mobile terminals 16 and operate to deliver presence information from each of the mobile terminals 16 to the service node 26.

Figure 9:
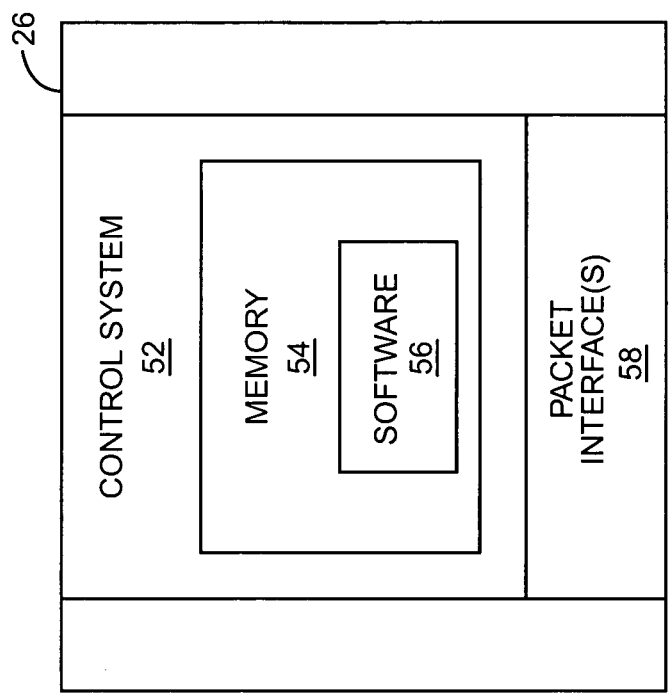
FIG. 9 is a block representation of a service node according to one embodiment of the present invention.

Turning now to FIG. 9, a block diagram of a service node 26 is illustrated. The service node 26 may include a control system 52 having sufficient memory 54 to store the software 56 necessary for operation as described above. The control system 52 is also associated with one or more packet interfaces 58 to facilitate the messaging interface 30 as well as optionally provide communications with the terminal adaptor 18 via the data network 36, as well as directly or indirectly with the wireline switch 14, cellular switch 20, and HLR 32.

Figure 10:
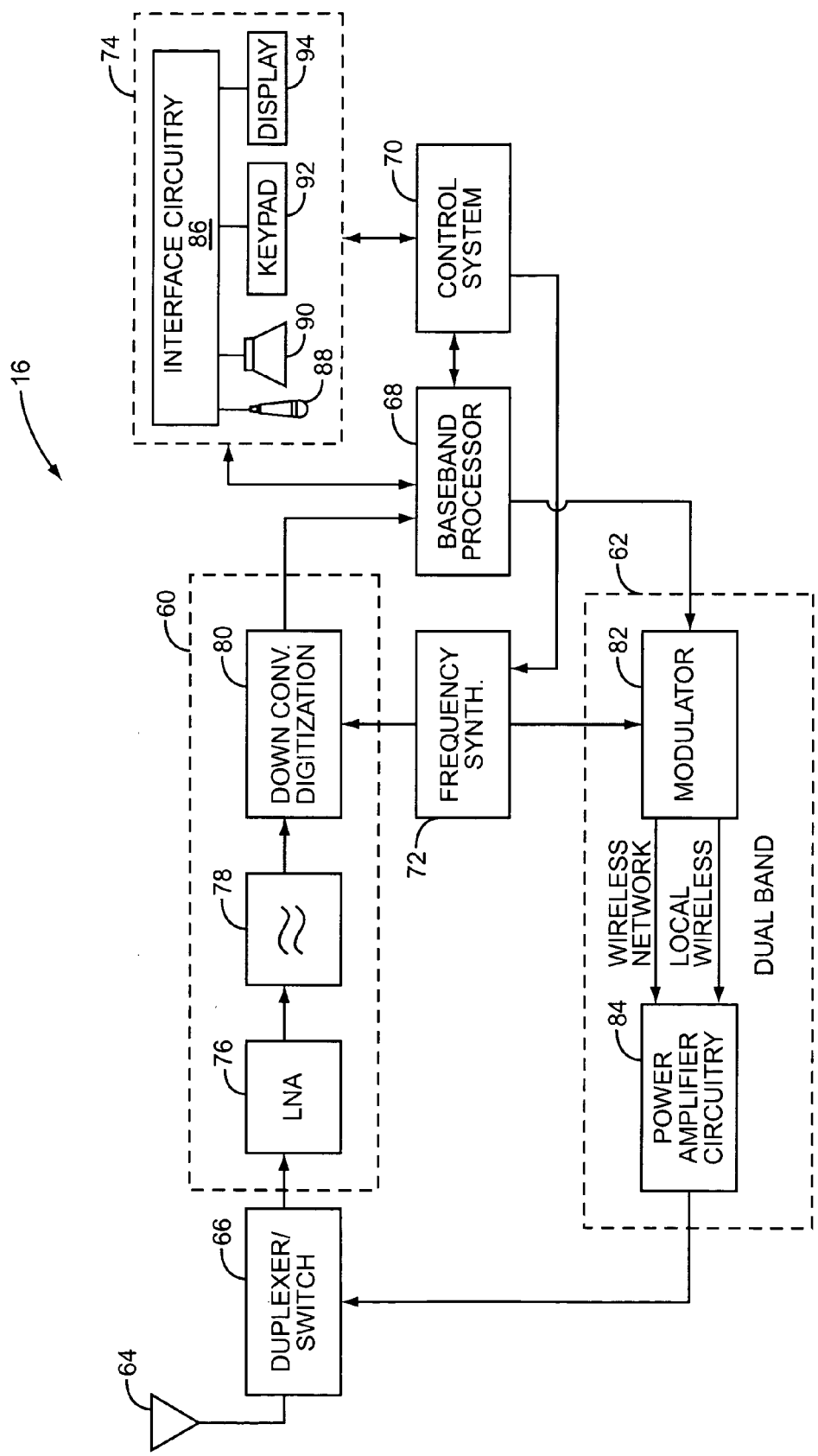
FIG. 10 is a block representation of a mobile terminal according to one embodiment of the present invention.

The basic architecture of the mobile terminal 16 is represented in FIG. 10 and may include a receiver front end 60, a radio frequency transmitter section 62, an antenna 64, a duplexer or switch 66, a baseband processor 68, a control system 70, a frequency synthesizer 72, and an interface 74. The receiver front end 60 receives information bearing radio frequency signals from one or more remote transmitters provided by a base station. A low noise amplifier 76 amplifies the signal. A filter circuit 78 minimizes broadband interference in the received signal, while downconversion and digitization circuitry 80 downconverts the filtered, received signal to an intermediate or baseband frequency signal, which is then digitized into one or more digital streams. The receiver front end 60 typically uses one or more mixing frequencies generated by the frequency synthesizer 72. The baseband processor 68 processes the digitized received signal to extract the information or data bits conveyed in the received signal. This processing typically comprises demodulation, decoding, and error correction operations. As such, the baseband processor 68 is generally implemented in one or more digital signal processors (DSPs).

On the transmit side, the baseband processor 68 receives digitized data, which may represent voice, data, or control information, from the control system 70, which it encodes for transmission. The encoded data is output to the transmitter 62, where it is used by a modulator 82 to modulate a carrier signal that is at a desired transmit frequency. Power amplifier circuitry 84 amplifies the modulated carrier signal to a level appropriate for transmission, and delivers the amplified and modulated carrier signal to the antenna 64 through the duplexer or switch 66.

As noted above, the mobile terminal 16 must be able to communicate with the terminal adaptor 18 as well as with the cellular network. Accordingly, the receiver front end 60, baseband processor 68, and radio frequency transmitter section 62 cooperate to provide either a wireless interface for the cellular network or the local wireless interface for the terminal adaptor 18. These functions may be implemented using redundant circuitry, or by configuring common circuitry to operate in different modes. The configuration of the mobile terminal 16 will be dictated by economics and designer choice.

A user may interact with the mobile terminal 16 via an interface 74, which may include interface circuitry 86 associated with a microphone 88, a speaker 90, a keypad 92, and a display 94. The interface circuitry 86 typically includes analog-to-digital converters, digital-to-analog converters, amplifiers, and the like. Additionally, it may include a voice encoder/decoder, in which case it may communicate directly with the baseband processor 68. The microphone 88 will typically convert audio input, such as the user's voice, into an electrical signal, which is then digitized and passed directly or indirectly to the baseband processor 68. Audio information encoded in the received signal is recovered by the baseband processor 68, and converted by the interface circuitry 86 into an analog signal suitable for driving the speaker 90. The keypad 92 and display 94 enable the user to interact with the mobile terminal 16, input numbers to be dialed, address book information, or the like, as well as monitor call progress information.

For additional information, please see U.S. application Ser. No. 10/409,280 filed Apr. 8, 2003 entitled INTEGRATED WIRELINE AND WIRELESS SERVICE; U.S. application Ser. No. 10/409,290 filed Apr. 8, 2003 entitled CALL TRANSFER FOR AN INTEGRATED WIRELINE AND WIRELESS SERVICE; U.S. application Ser. No. 60/472,277 filed May 21, 2003 entitled WLAN CALL HANDOFF TO WIRELESS USING DYNAMICALLY ASSIGNED TEMPORARY NUMBER; U.S. application Ser. No. 60/472,152 filed May 21, 2003 entitled HANDOFF FROM CELLULAR NETWORK TO WLAN NETWORK; U.S. application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER; and U.S. application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:
1. A method comprising:
   receiving a messaging service message including presence information from a mobile terminal, which is capable of establishing calls via a cellular network and also capable of establishing calls via a terminal adaptor using a local wireless interface; and
   determining whether to route an incoming call intended for the mobile terminal to the mobile terminal via the cellular network or via the terminal adaptor based on the presence information where the messaging service message is received when the mobile terminal moves into coverage of the terminal adaptor, wherein
      when the presence information is indicative of the mobile terminal and the terminal adaptor being able to communicate, determining to route the incoming call to the mobile terminal via the terminal adaptor, otherwise determining to route the incoming call to the mobile terminal via the cellular network.

2. The method of claim 1 further comprising:
receiving a second messaging service message including second presence information from a second mobile terminal, which is capable of establishing calls via the cellular network or the terminal adaptor; and
determining whether to route a second incoming call intended for the second mobile terminal to the second mobile terminal via the cellular network or via the terminal adaptor based on the second presence information.

3. The method of claim 1 wherein the presence information bears on a location of the mobile terminal.

4. The method of claim 1 further comprising:
receiving the messaging service message including the presence information of a first type when the mobile terminal and the terminal adaptor are able to communicate; and
receiving the messaging service message including the presence information of a second type when the mobile terminal and the terminal adaptor are not able to communicate.

5. The method of claim 1 wherein the messaging service message is a Short Message Service message.

6. The method of claim 1 wherein the messaging service message is received through the cellular network.

7. The method of claim 6 wherein the messaging service message is received via a message service messaging center associated with the cellular network.

8. The method of claim 1 wherein the messaging service message is received through the terminal adaptor.

9. The method of claim 1 wherein the terminal adaptor is operatively associated with a wireline switch and the messaging service message travels through the terminal adaptor and the wireline switch from the mobile terminal.

10. The method of claim 9 wherein the terminal adaptor is operatively associated with a data access network and the messaging service message travels through the data access network and the wireline switch from the mobile terminal.

11. The method of claim 1 further comprising:
when determining the incoming call should be routed via the terminal adaptor, sending instructions to effect routing of the incoming call to the mobile terminal via the terminal adaptor; and
when determining the incoming call should be routed via the cellular network, sending instructions to effect routing of the incoming call to the mobile terminal via the cellular network.

12. The method of claim 1 further comprising:
when determining the incoming call should be routed via the terminal adaptor, instructing a wireline switch to route the incoming call to the mobile terminal via the terminal adaptor; and
when determining the incoming call should be routed via the cellular network, instructing the wireline switch to route the incoming call to the mobile terminal via the cellular network.

13. The method of claim 1 wherein the terminal adaptor and the mobile terminal communicate with each other via local wireless communications, which provide a limited communication range.

14. The method of claim 13 wherein the local wireless communications are effected using one of 802.11, DECT, Bluetooth, and analog cordless technologies.

15. The method of claim 1 wherein the cellular network is based on one of the group consisting of GSM, CDMA, UMTS, TDMA, and analog cellular technologies.

16. The method of claim 1, wherein a second messaging service message is received when the mobile terminal moves out of coverage of the terminal adaptor.

17. A system comprising:
at least one communication interface; and
a control system associated with the at least one communication interface and adapted to:
receive a messaging service message including presence information from a mobile terminal, which is capable of establishing calls via a cellular network and also capable of establishing calls via a terminal adaptor using a local wireless interface; and
determine whether to route an incoming call intended for the mobile terminal to the mobile terminal via the cellular network or via the terminal adaptor based on the presence information where the messaging service message is received when the mobile terminal moves into coverage of the terminal adaptor, wherein:
when the presence information is indicative of the mobile terminal and the terminal adaptor being able to communicate, determine to route the incoming call to the mobile terminal via the terminal adaptor otherwise
determining to route the incoming call to the mobile terminal via the cellular network.

18. The system of claim 17 wherein the control system is further adapted to:
receive a second messaging service message including second presence information from a second mobile terminal, which is capable of establishing calls via the cellular network or the terminal adaptor; and
determine whether to route a second incoming call intended for the second mobile terminal to the second mobile terminal via the cellular network or via the terminal adaptor based on the second presence information.

19. The system of claim 17 wherein the presence information bears on a location of the mobile terminal.

20. The system of claim 17 wherein the control system is further adapted to:
receive the messaging service message including the presence information of a first type when the mobile terminal and the terminal adaptor are able to communicate; and
receive the messaging service message including the presence information of a second type when the mobile terminal and the terminal adaptor are not able to communicate.

21. The system of claim 17 wherein the messaging service message is a Short Message Service message.

22. The system of claim 17 wherein the messaging service message is received through the cellular network.

23. The system of claim 22 wherein the messaging service message is received via a message service messaging center associated with the cellular network.

24. The system of claim 17 wherein the messaging service message is received through the terminal adaptor.

25. The system of claim 17 wherein the terminal adaptor is operatively associated with a wireline switch and the messaging service message travels through the terminal adaptor and the wireline switch from the mobile terminal.

26. The system of claim 25 wherein the terminal adaptor is operatively associated with a data access network and the messaging service message travels through the data access network and the wireline switch from the mobile terminal.

27. The system of claim 17 wherein the control system is further adapted to:
when determining the incoming call should be routed via the terminal adaptor, send instructions to effect routing of the incoming call to the mobile terminal via the terminal adaptor; and
when determining the incoming call should be routed via the cellular network, send instructions to effect routing of the incoming call to the mobile terminal via the cellular network.

28. The system of claim 17 wherein the control system is further adapted to:
when determining the incoming call should be routed via the terminal adaptor, instruct a wireline switch to route the incoming call to the mobile terminal via the terminal adaptor; and
when determining the incoming call should be routed via the cellular network, instruct the wireline switch to route the incoming call to the mobile terminal via the cellular network.

29. The system of claim 17 wherein the terminal adaptor and the mobile terminal communicate with each other via local wireless communications, which provide a limited communication range.

30. The system of claim 29 wherein the local wireless communications are effected using one of 802.11, DECT, Bluetooth, and analog cordless technologies.

31. The system of claim 17 wherein the cellular network is based on one of the group consisting of GSM, CDMA, UMTS, TDMA, and analog cellular technologies.

32. The system of claim 17, wherein a second messaging service message is received when the mobile terminal moves out of coverage of the terminal adaptor.

33. A system comprising:
means for receiving a messaging service message including presence information from a mobile terminal, which is capable of establishing calls via a cellular network and also capable of establishing calls via a terminal adaptor using a local wireless interface; and
means for determining whether to route an incoming call intended for the mobile terminal to the mobile terminal via the cellular network or via the terminal adaptor based on the presence information where the messaging service message is received when the mobile terminal moves into coverage of the terminal adaptor, wherein
when the presence information is indicative of the mobile terminal and the terminal adaptor being able to communicate, determining to route the incoming call to the mobile terminal via the terminal adaptor otherwise
determining to route the incoming call to the mobile terminal via the cellular network.

34. A mobile terminal comprising:
a receiver;
a transmitter; and
a control system operatively associated with the receiver and transmitter and adapted to:
facilitate wireless communications via a cellular network to support telephony calls;
facilitate local wireless communications with a terminal adaptor to support telephony calls;
send a messaging service message including presence information to be delivered to a service node, which controls routing of incoming calls directed to the mobile terminal based on the presence information, wherein the messaging service message is sent when the mobile terminal moves into coverage of the terminal adaptor;
generate the presence information to indicate the mobile terminal and the terminal adaptor are able to communicate when the mobile terminal and the terminal adaptor are able to communicate; and
generate the presence information to indicate the mobile terminal and the terminal adaptor are not able to communicate when the mobile terminal and the terminal adaptor are not able to communicate.

35. The mobile terminal of claim 34 wherein the messaging service message is a Short Message Service message.

36. The mobile terminal of claim 34 wherein the local wireless communications are effected using one of 802.11, DECT, Bluetooth, and analog cordless technologies.

37. The mobile terminal of claim 34 wherein the cellular network is based on one of the group consisting of GSM, CDMA, UMTS, TDMA, and analog cellular technologies.

38. The system of claim 33, wherein a second messaging service message is received when the mobile terminal moves out of coverage of the terminal adaptor.

39. The mobile terminal of claim 34, wherein a second messaging service message is sent when the mobile terminal moves out of coverage of the terminal adaptor.

* * * * *